United States Patent
Wang

Patent Number: 5,982,486
Date of Patent: Nov. 9, 1999

[54] METHOD AND APPARATUS FOR ON-THE-MOVE DETECTION OF CHEMICAL AGENTS USING AN FTIR SPECTROMETER

[75] Inventor: Chung-Tao David Wang, Melville, N.Y.

[73] Assignee: AIL Systems, Incorporated, Deer Park, N.Y.

[21] Appl. No.: 09/066,112

[22] Filed: Apr. 23, 1998

[51] Int. Cl.$^6$ .................................................. G01B 9/02
[52] U.S. Cl. ........................................ 356/346; 702/28
[58] Field of Search ....................... 356/346; 250/339.08, 250/339.09; 702/28

[56] References Cited

U.S. PATENT DOCUMENTS

| | | | |
|---|---|---|---|
| 4,128,337 | 12/1978 | Zehnpfennig | 356/346 |
| 5,305,076 | 4/1994 | Inoue et al. | 356/346 |
| 5,751,418 | 5/1998 | Kimura et al. | 250/339.09 |
| 5,790,250 | 8/1998 | Wang et al. | 356/346 |

*Primary Examiner*—Samuel A. Turner
*Attorney, Agent, or Firm*—Hoffmann & Baron, LLP

[57] ABSTRACT

A method for improving the sensitivity of a Fourier transform infrared (FTIR) spectrometer, especially one which is mounted on a movable platform, includes the step of obtaining a background spectrum and an analytical spectrum from an interferogram, and determining the absorption spectrum from the analytical spectrum and the background spectrum. Then, a classical least squares analysis is applied to the absorption spectrum, with reference to a reference spectrum. The classical least squares analysis removes the bias term, and the first and the second-order correction terms related to frequency from the measured absorption spectrum. The method preferably includes two feedback paths in which the background spectrum used in the analysis is derived from a current background spectrum and previously occurring, co-added background spectra using a weighted average approach. The other feedback path involves using one or more alternative reference spectra should a saturation condition exist.

13 Claims, 24 Drawing Sheets

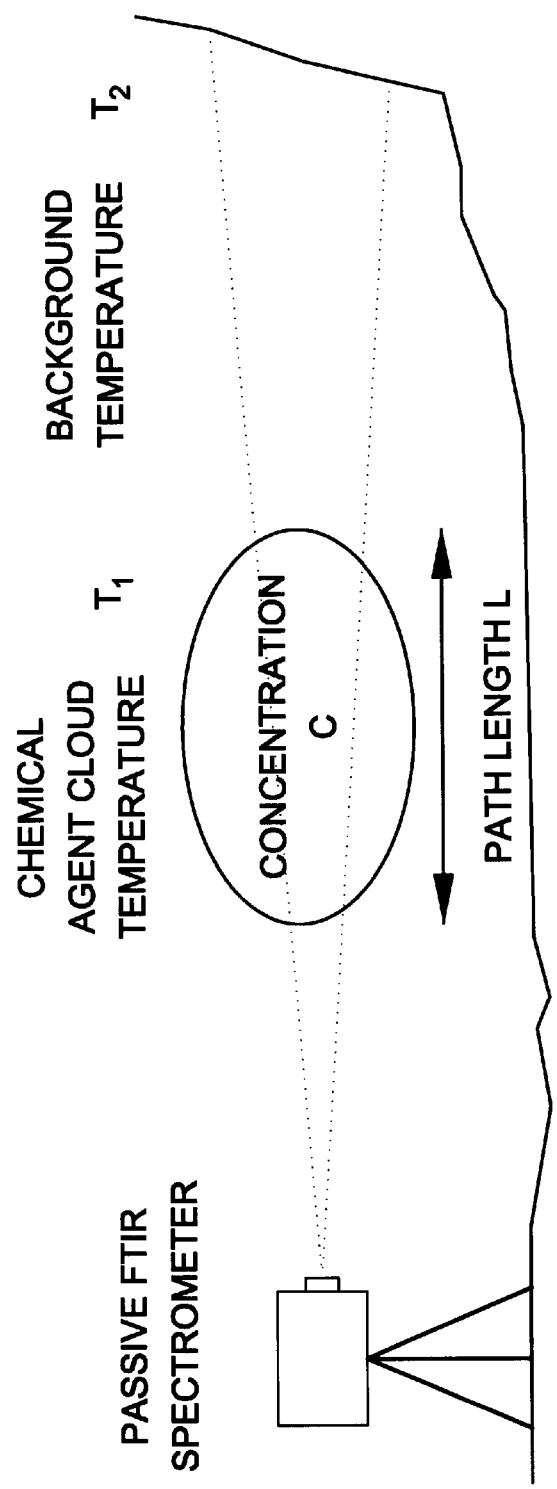
FIG-5 PASSIVE FTIR SPECTROMETER REQUIRES TEMPERATURE DIFFERENCE ($T_1-T_2$) TO DETECT THE PRESENCE OF CHEMICAL AGENTS

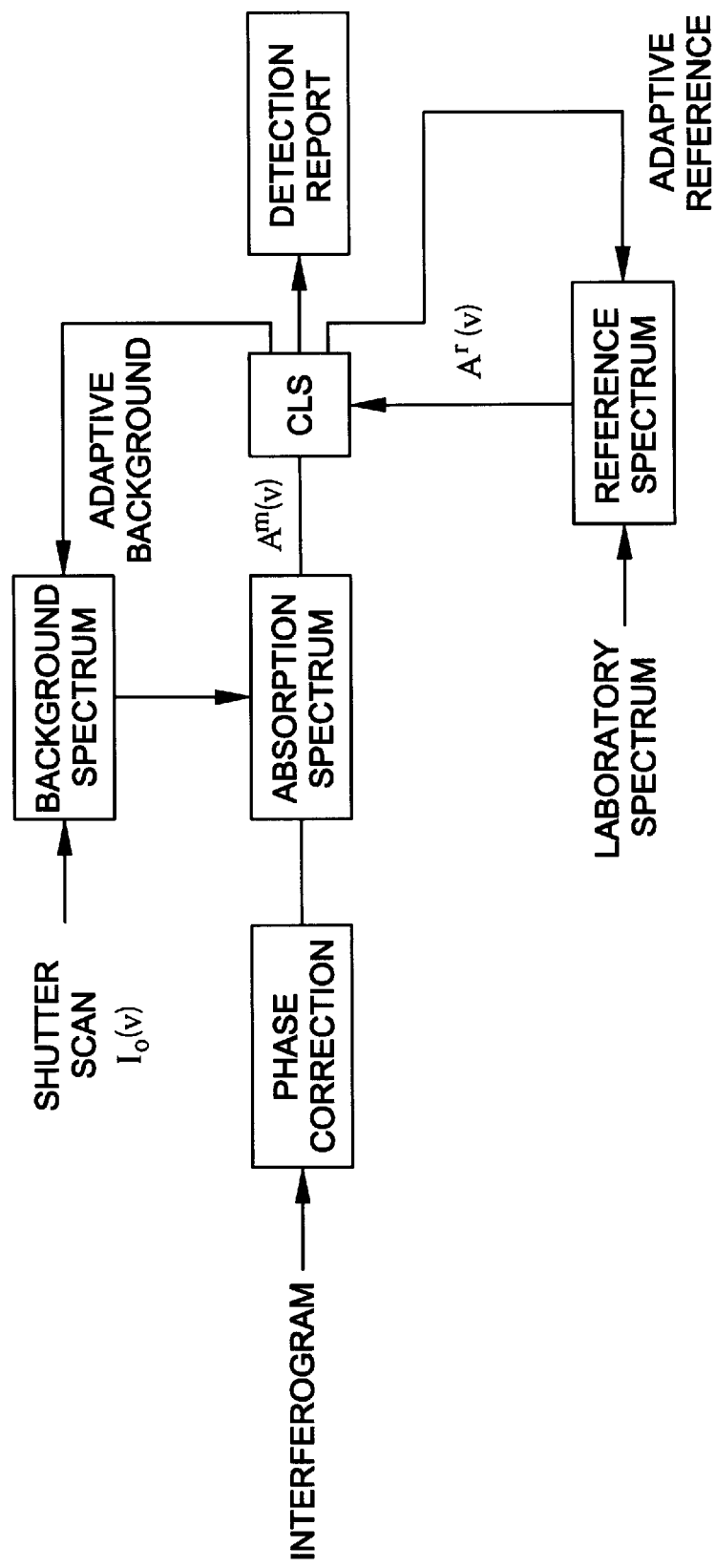
FIG-6 ADAPTIVE PROCESSING TECHNIQUES TO DETECT CHEMICAL AGENTS IN MOVING PLATFORMS

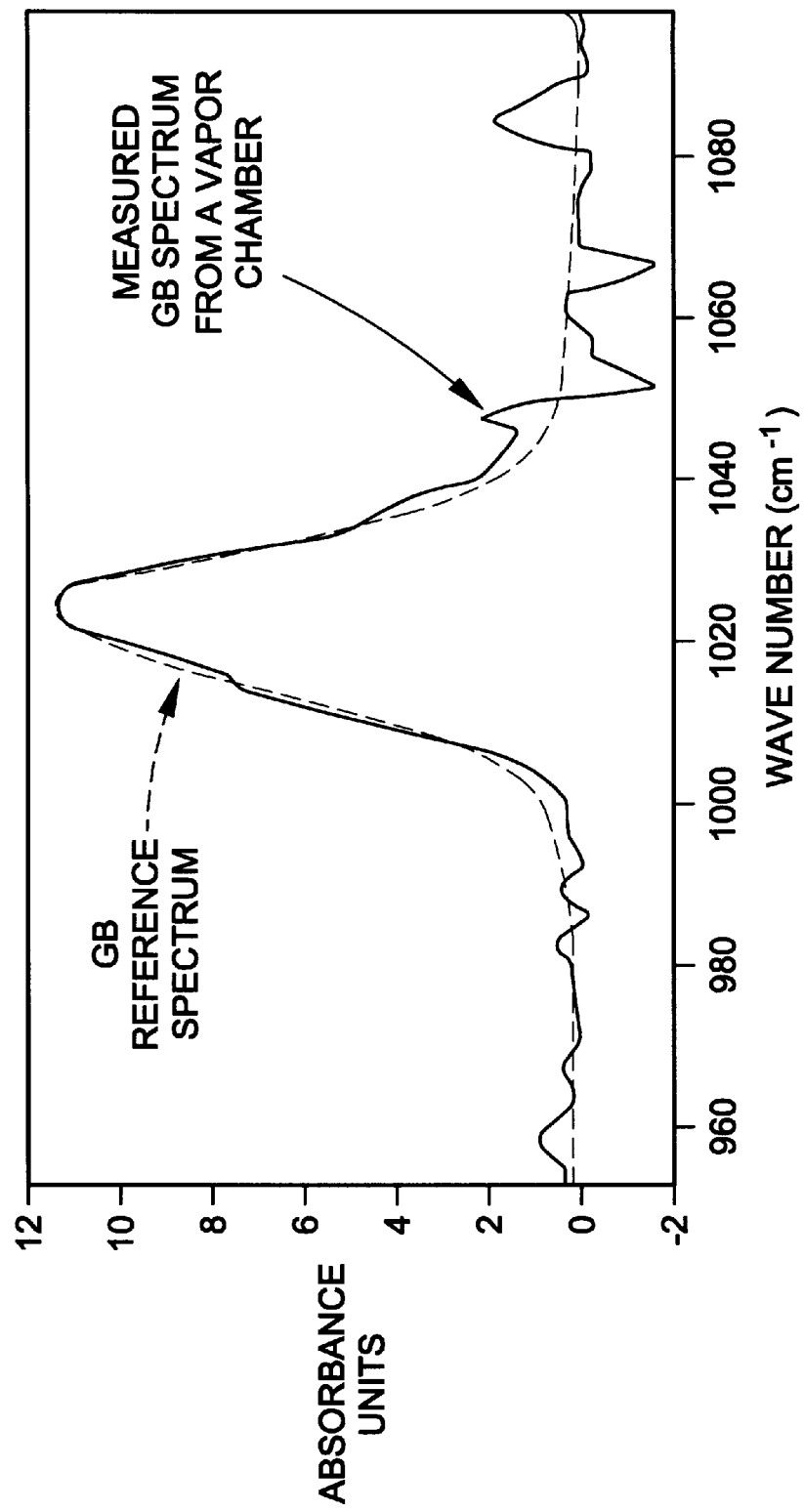
FIG-7  MEASURED GB ABSORPTION SPECTRUM VERSUS THE REFERENCE SPECTRUM

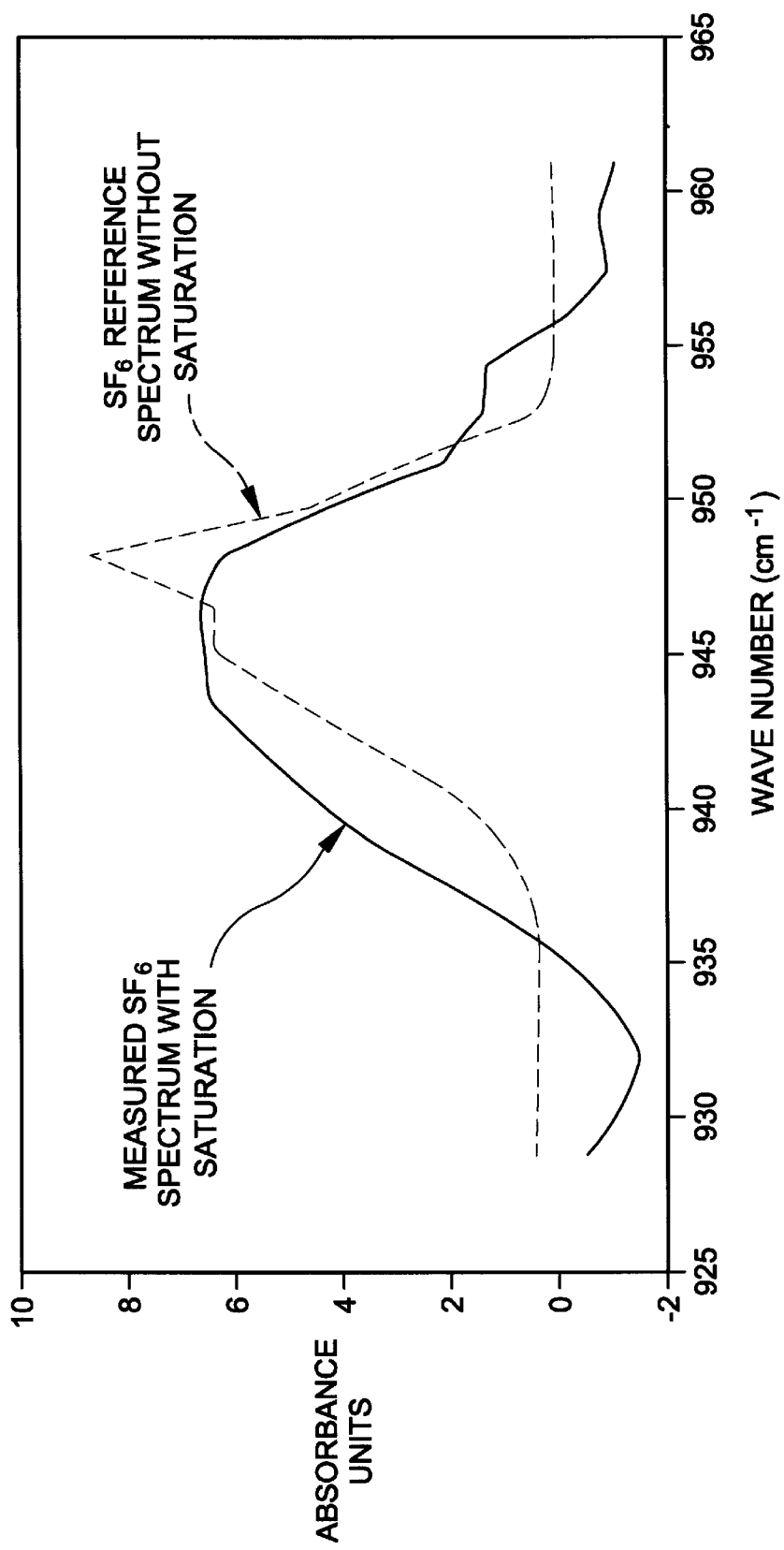
FIG-8a MEASURED SF6 SPECTRUM WITH SATURATION MAY LOOK DIFFERENT FROM THE LABORATORY REFERENCE SPECTRUM

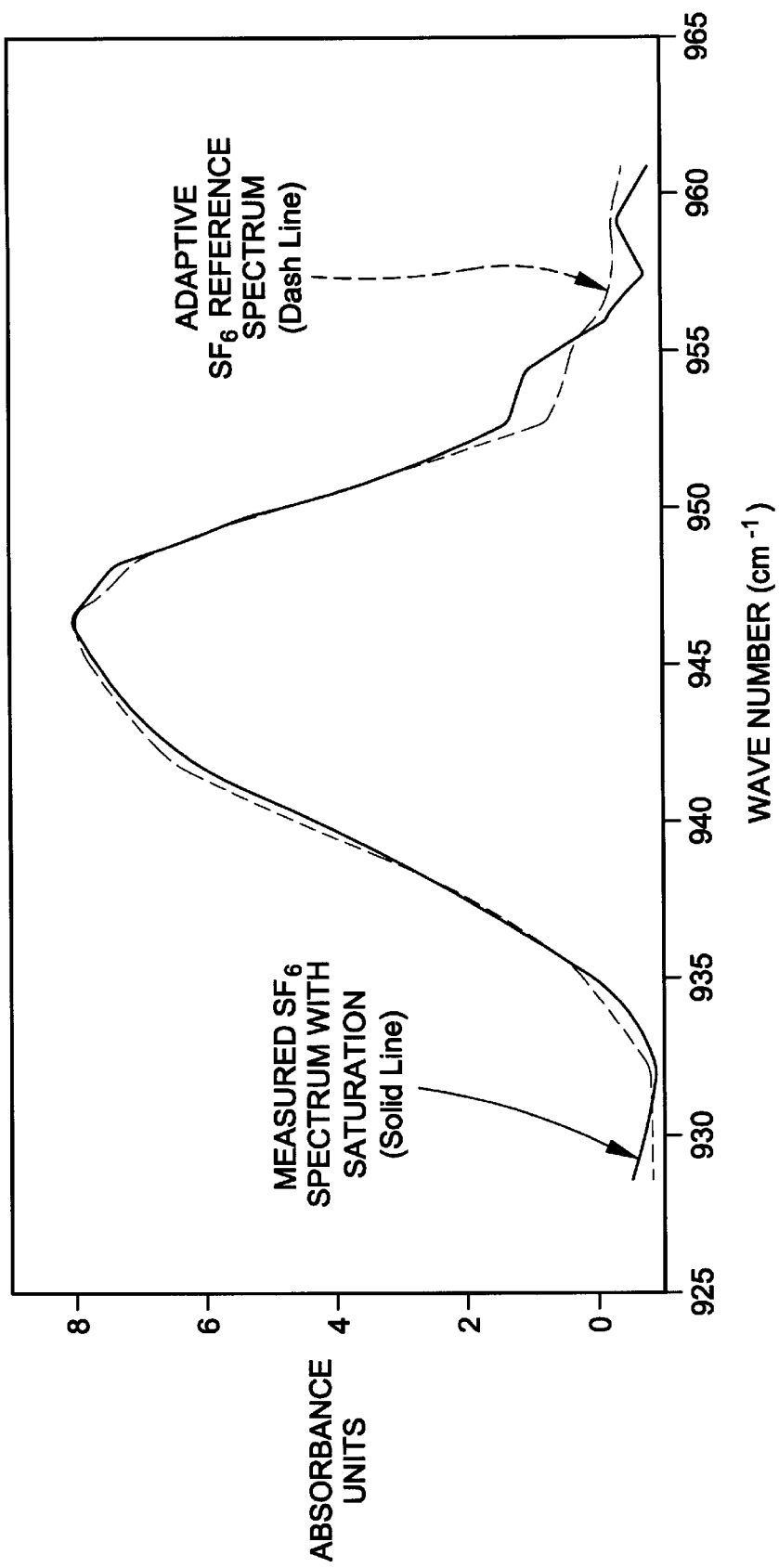
FIG-8b IMPROVING THE DETECTION OF SATURATED SF₆ USING CONCENTRATION-WEIGHTED AVERAGE REFERENCE

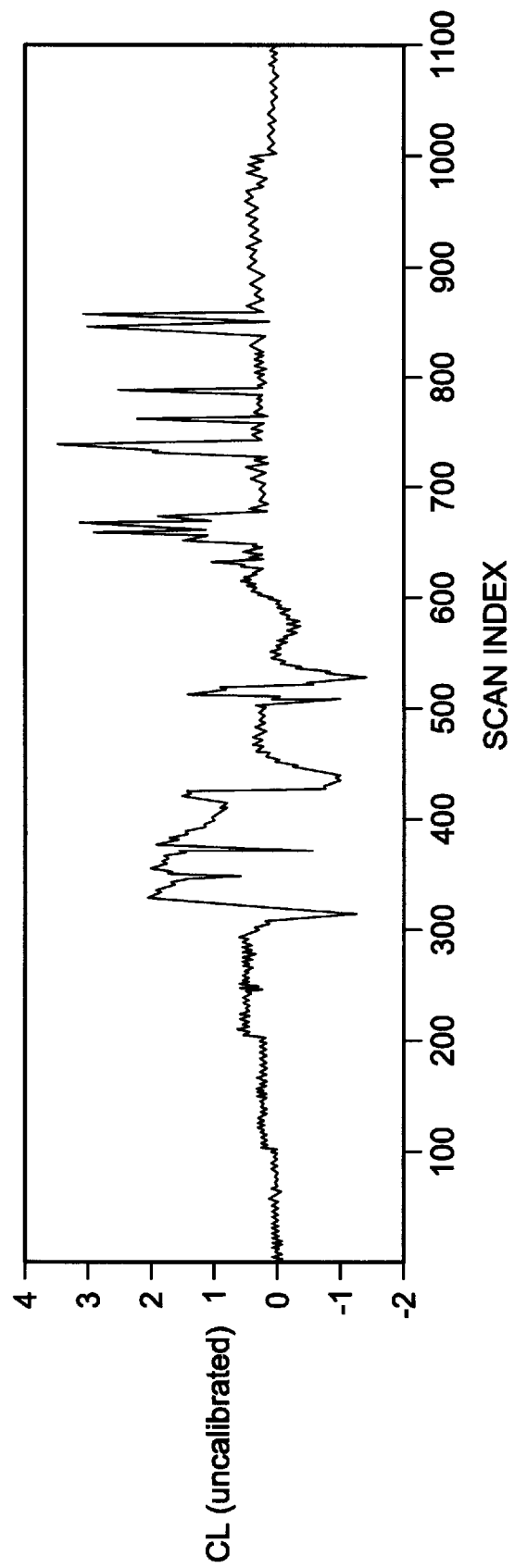
FIG-9a ESTIMATED SF$_6$ CONCENTRATION-PATHLENGTH USING TWO BACKGROUND EXTRACTION TECHNIQUES (FIXED BACKGROUND)

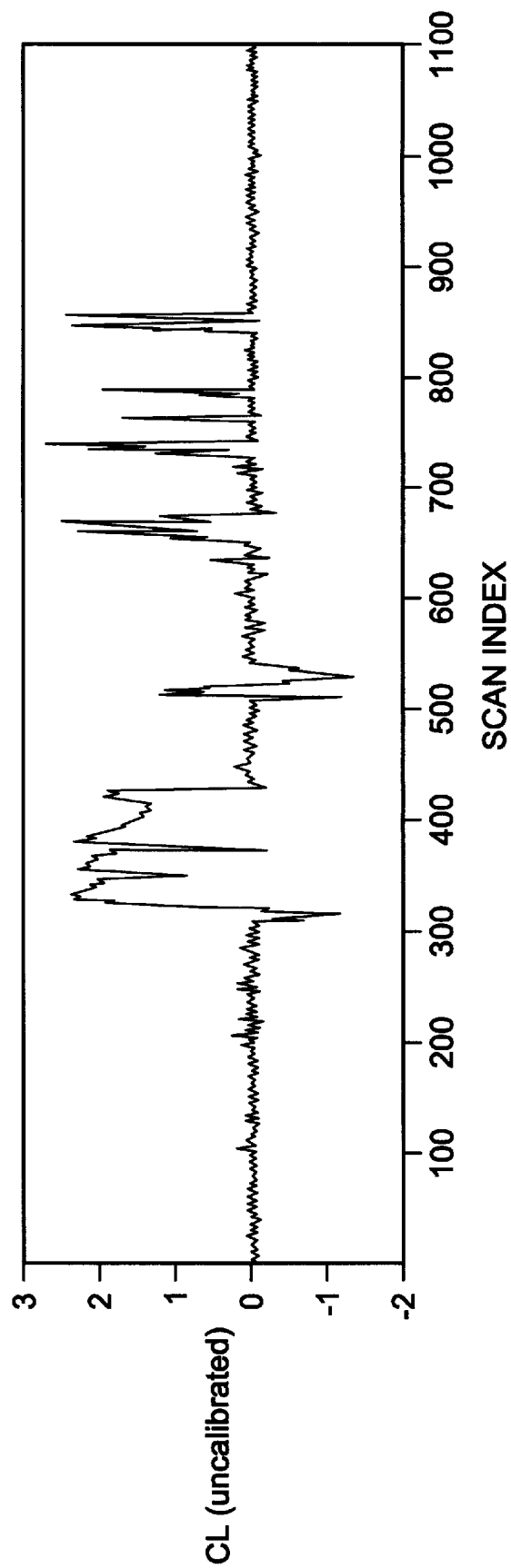
FIG-9b ESTIMATED SF$_6$ CONCENTRATION-PATHLENGTH USING TWO BACKGROUND EXTRACTION TECHNIQUES (WEIGHTED AVERAGE BACKGROUND)

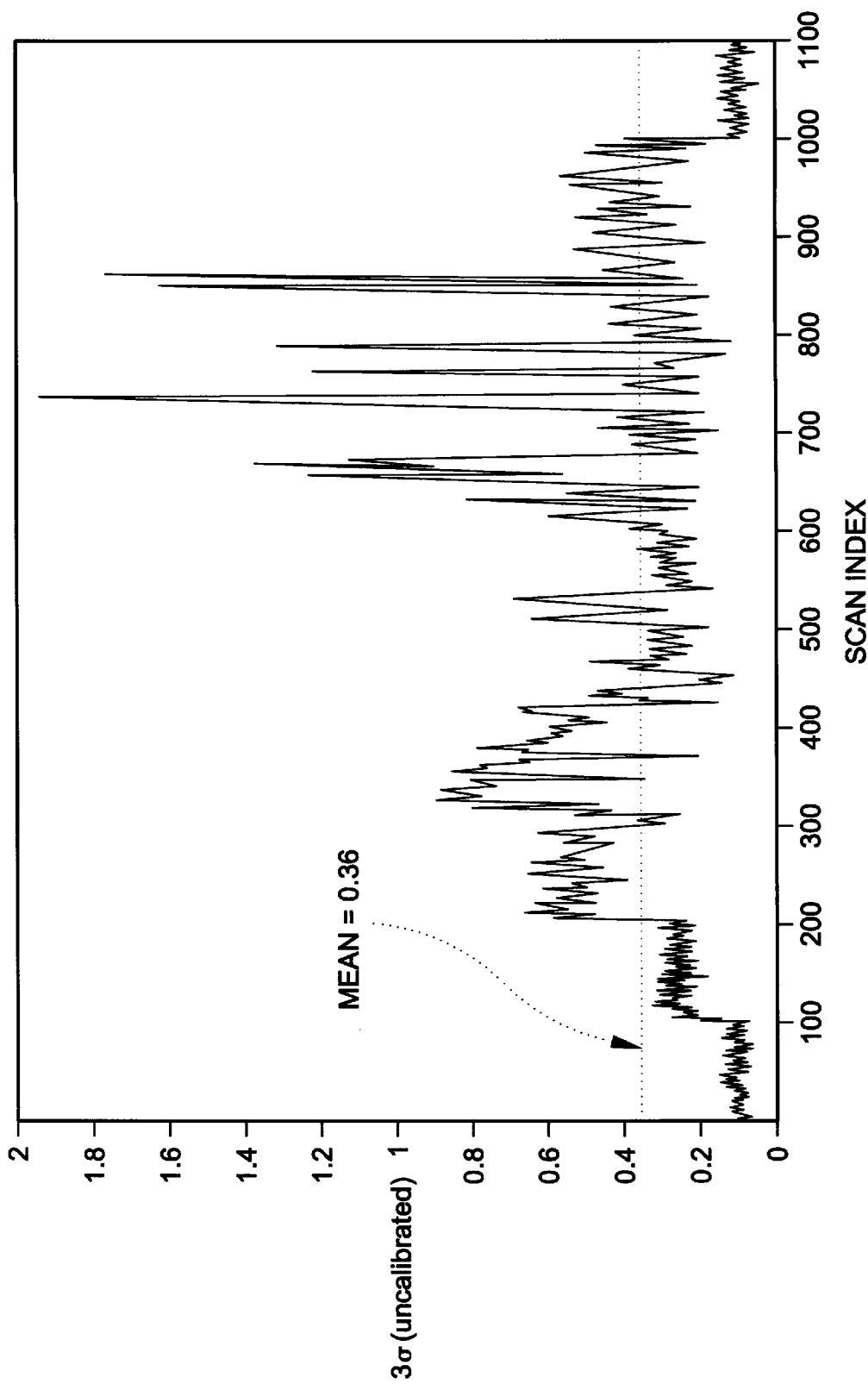
FIG-10a DETECTION LIMITS (3σ) VARIES DUE TO ON-THE-MOVE BACKGROUND CHANGES

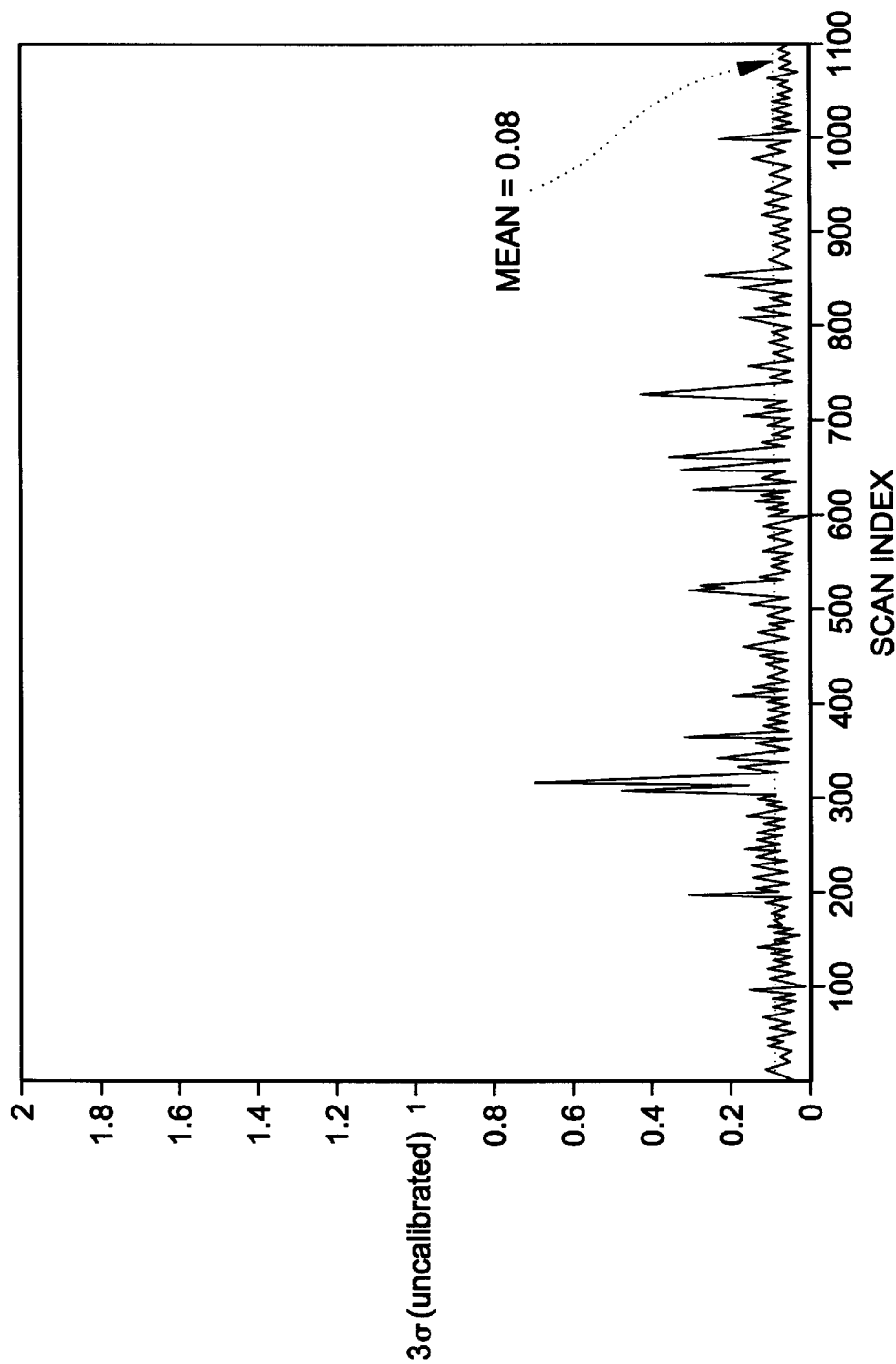

FIG-11 MEASURED CONCENTRATION-PATHLENGTH OF GB AS A FUNCTION OF TEMPERATURE DIFFERENCE BETWEEN CHEMICAL AGENT AND BACKGROUND

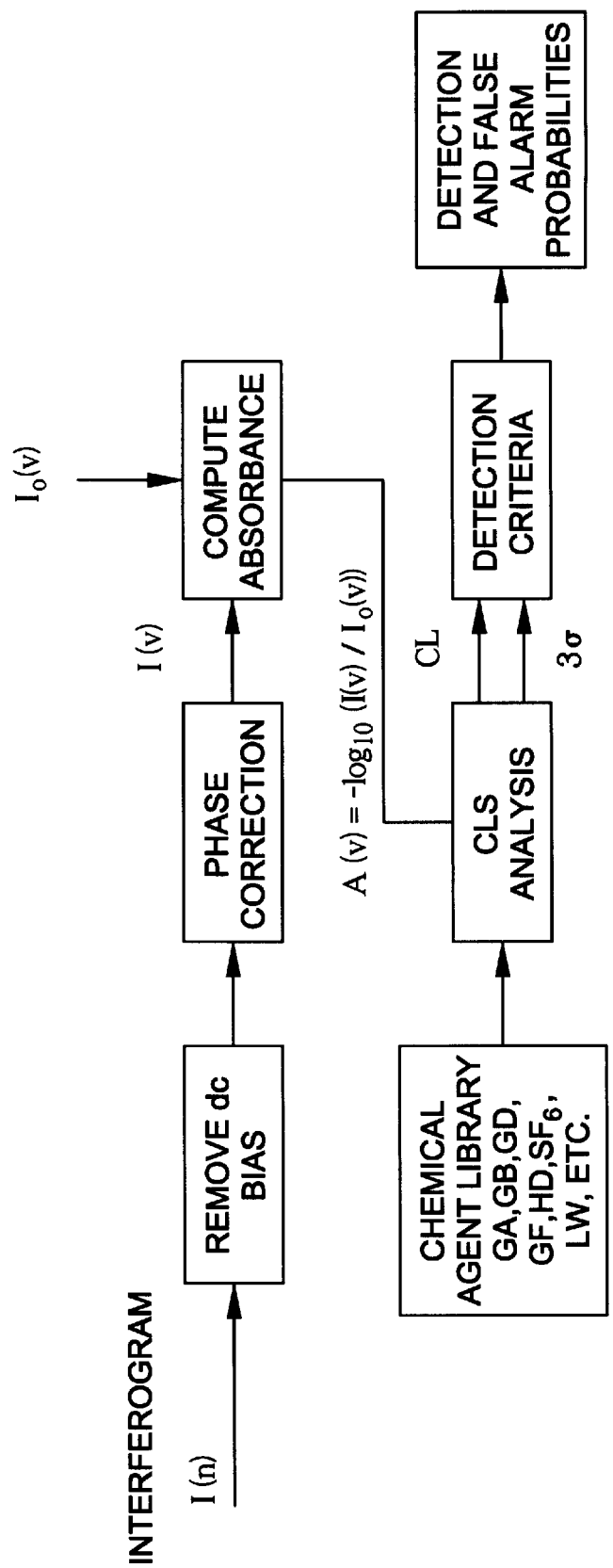
FIG-12 SIGNAL PROCESSING FLOWCHART FOR CHEMICAL AGENT DETECTION USING THE CLASSICAL LEAST SQUARES (CLS) METHOD

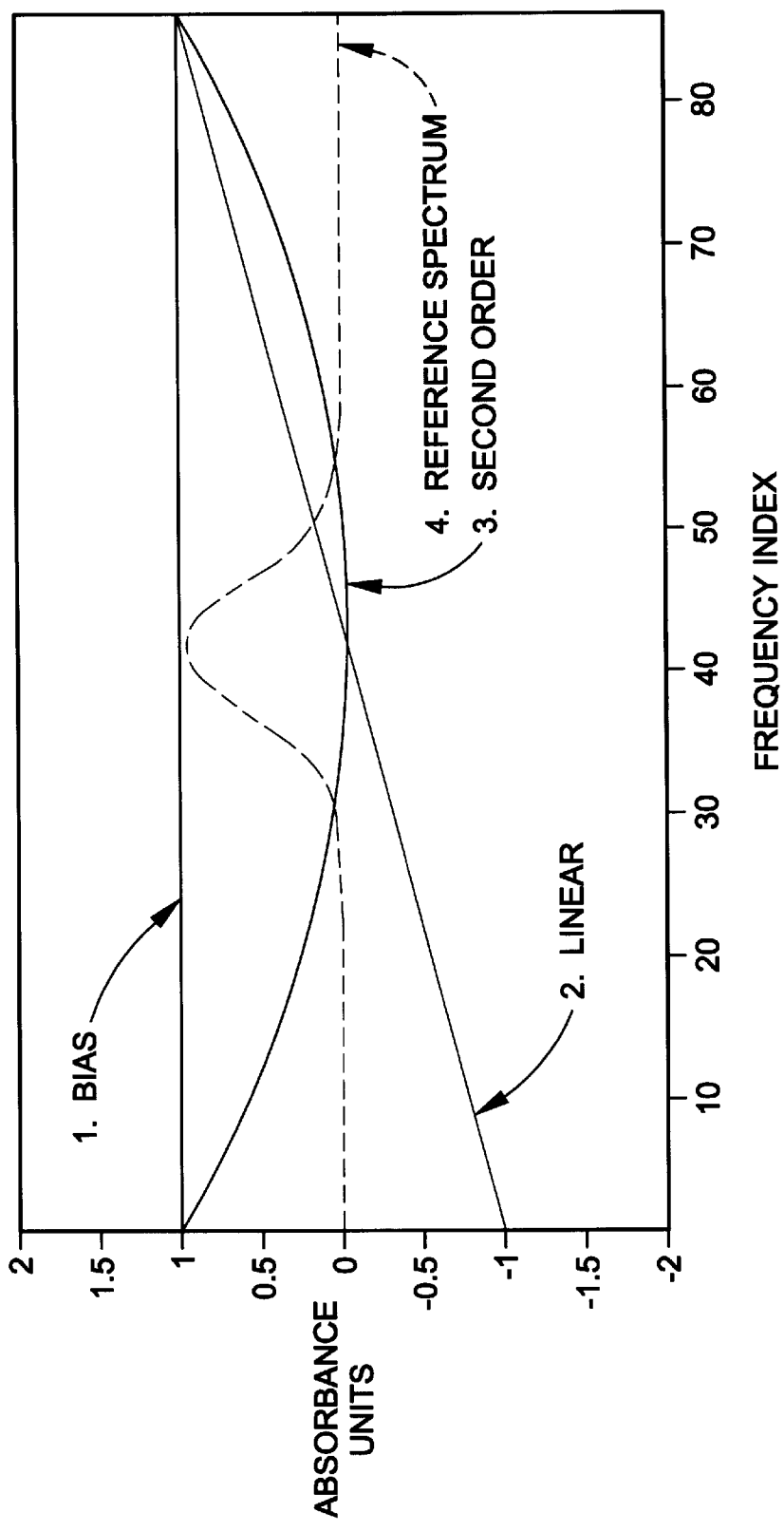
FIG-13  IMPROVE DETECTION SENSITIVITY BY USING A LINEAR REGRESSION
MODEL WITH 4 TERMS

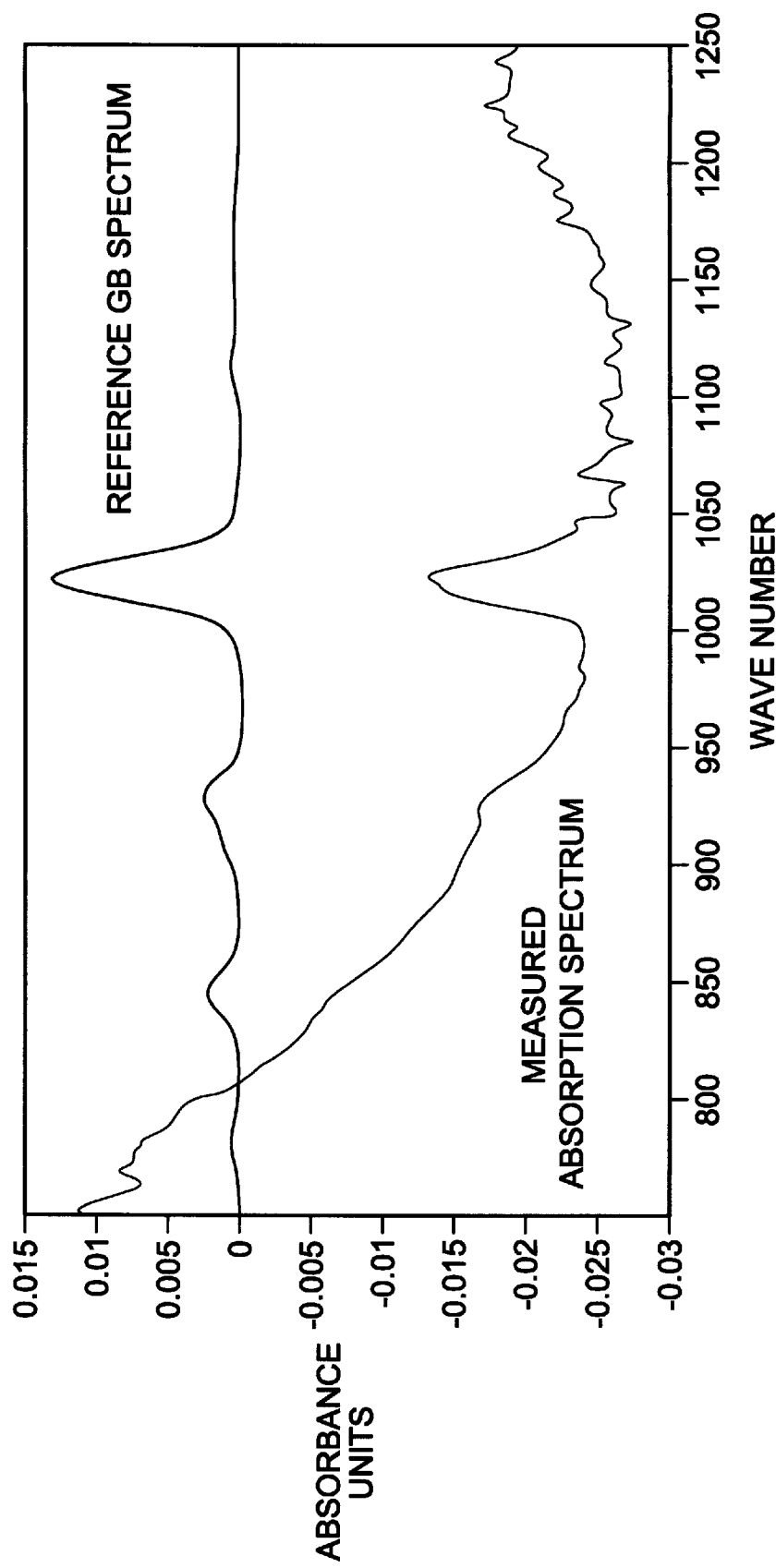
FIG-14a BASELINE VARIATIONS BETWEEN MEASURED AND REFERENCE SPECTRA MUST BE REMOVED TO ACHIEVE OPTIMUM DETECTION SENSITIVITY

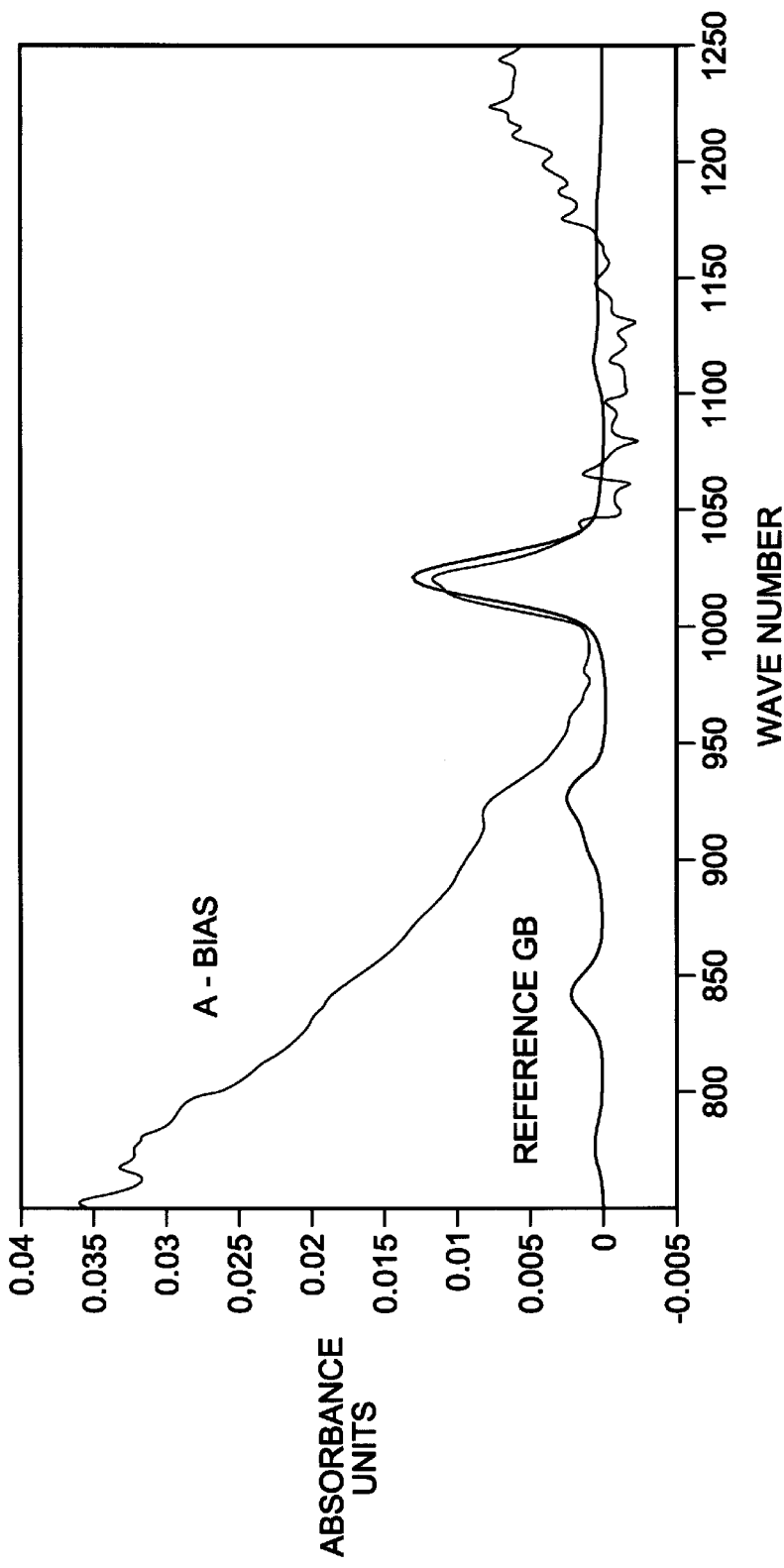
FIG-14b SUBTRACTING THE BIAS FROM THE MEASURED SPECTRUM IS THE FIRST STEP TO IMPROVING DETECTION SENSITIVITY

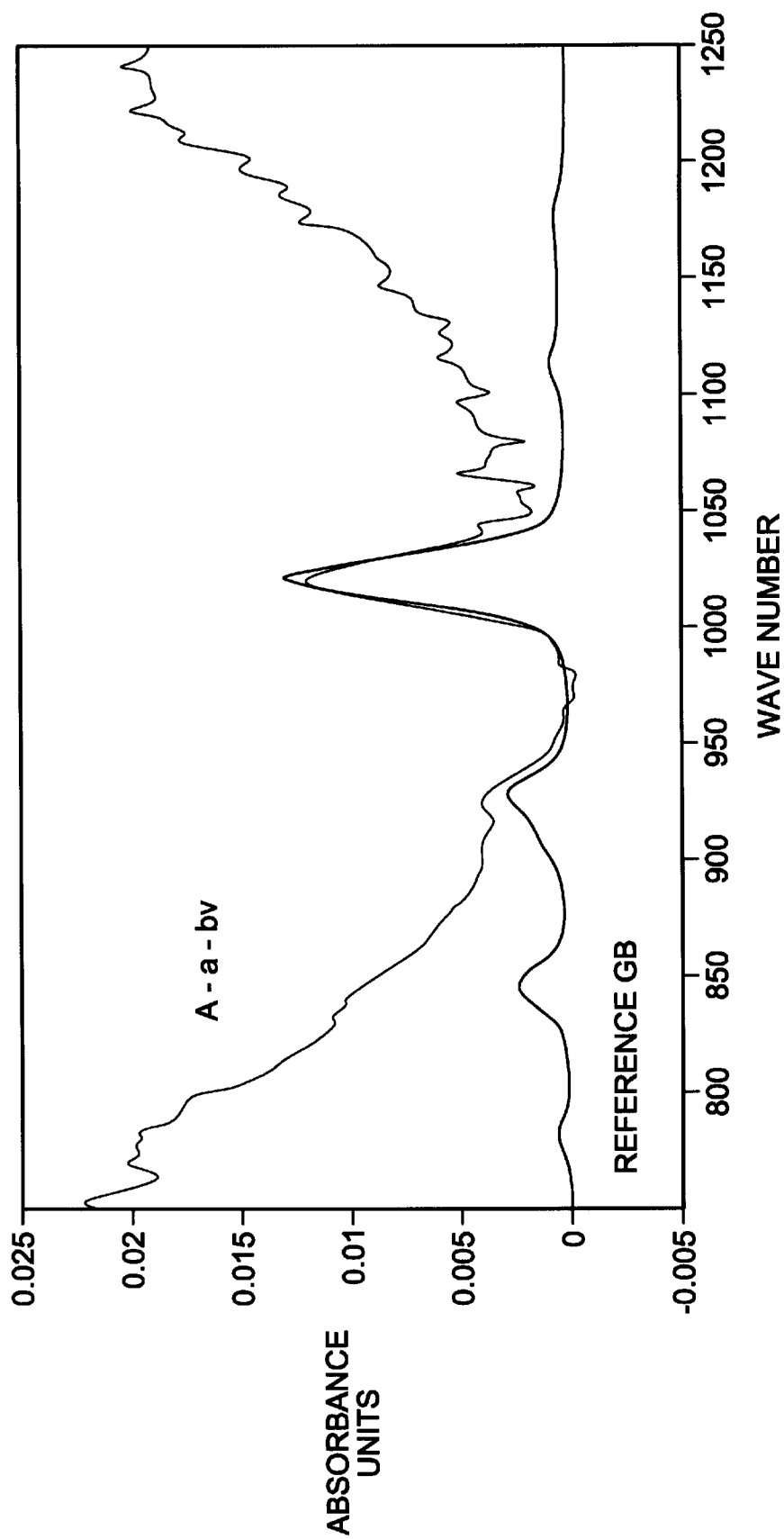
FIG-14C SUBTRACTING THE BIAS AND THE LINEAR TERMS FROM THE MEASURED SPECTRUM IMPROVES THE DETECTION FURTHER

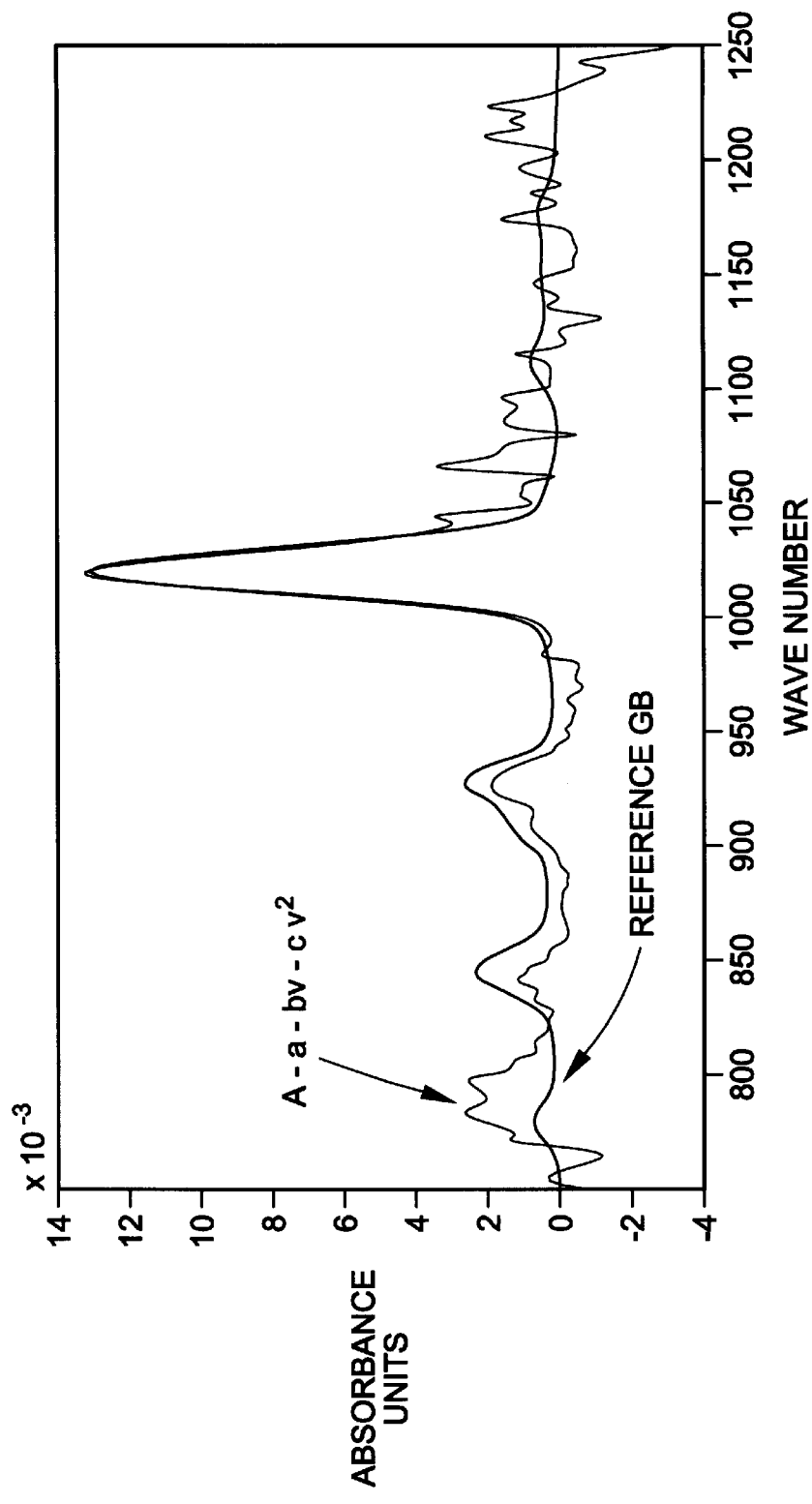
FIG-14d SUBTRACTING THE BIAS, THE LINEAR TERM, AND THE SECOND ORDER TERM FROM THE MEASURED SPECTRUM COMPLETELY FLATTENS THE BASELINE

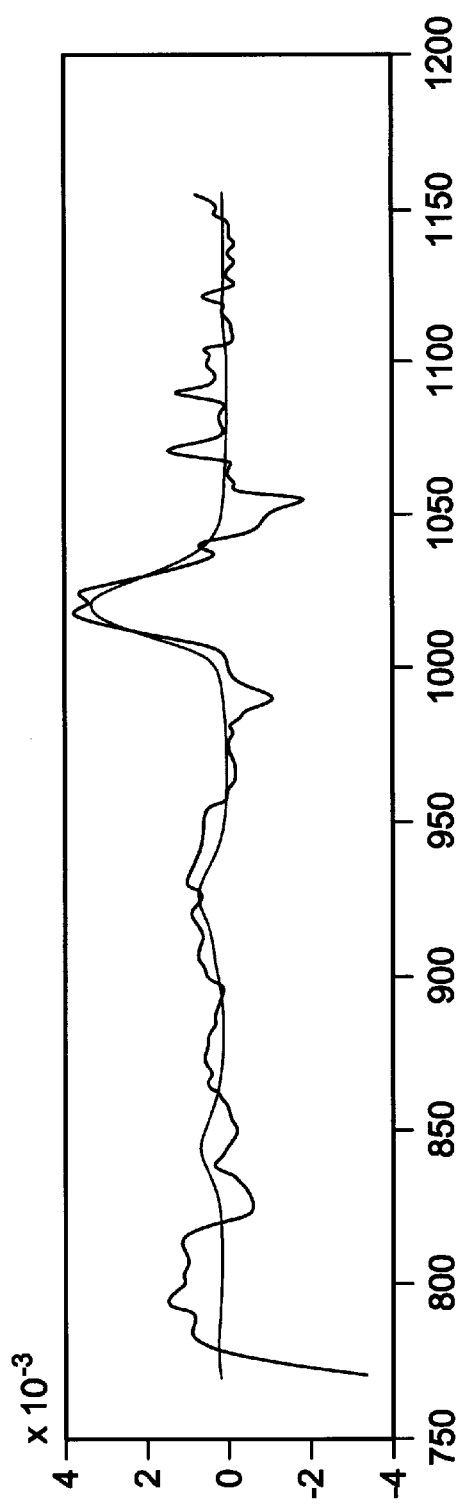
FIG-15a  SUBTRACT REFERENCE FROM THE MEASURED SPECTRUM TO OBTAIN RESIDUAL ERROR SPECTRUM $\varepsilon(v)$ (MEASURED GB SPECTRUM FOR $\Delta T = 1°C$ (Scan No. 1800))

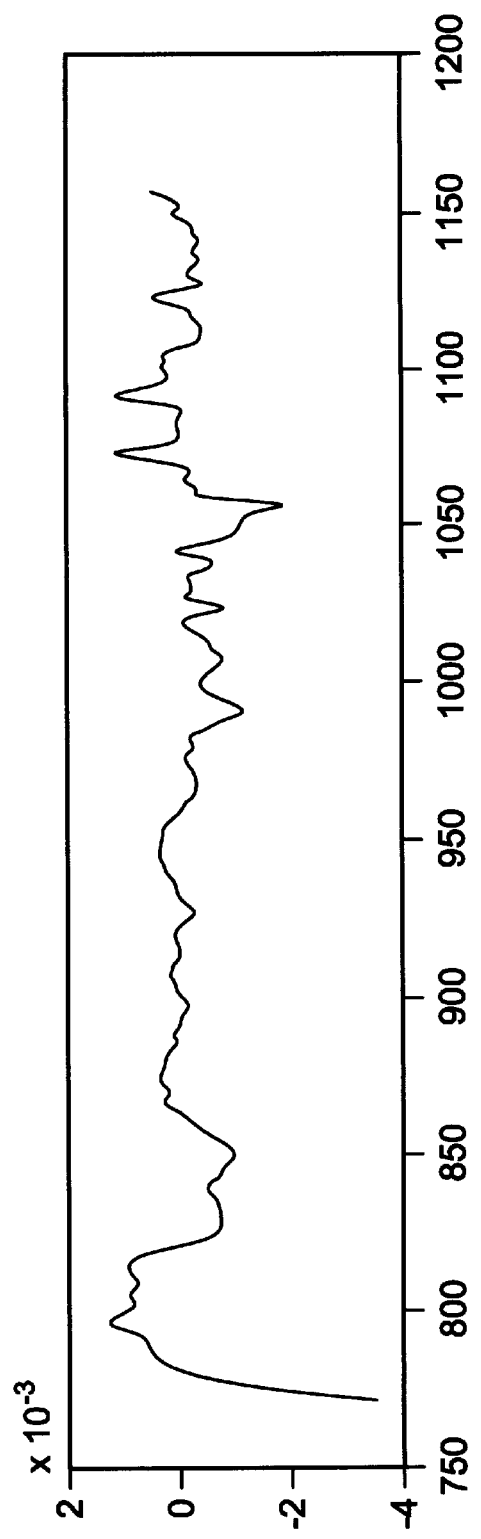
FIG-15b SUBTRACT REFERENCE FROM THE MEASURED SPECTRUM TO OBTAIN RESIDUAL ERROR SPECTRUM $\varepsilon(v)$ (RESIDUAL SPECTRUM AFTER THE ITERATIVE SUBTRACTION ALGORITHM)

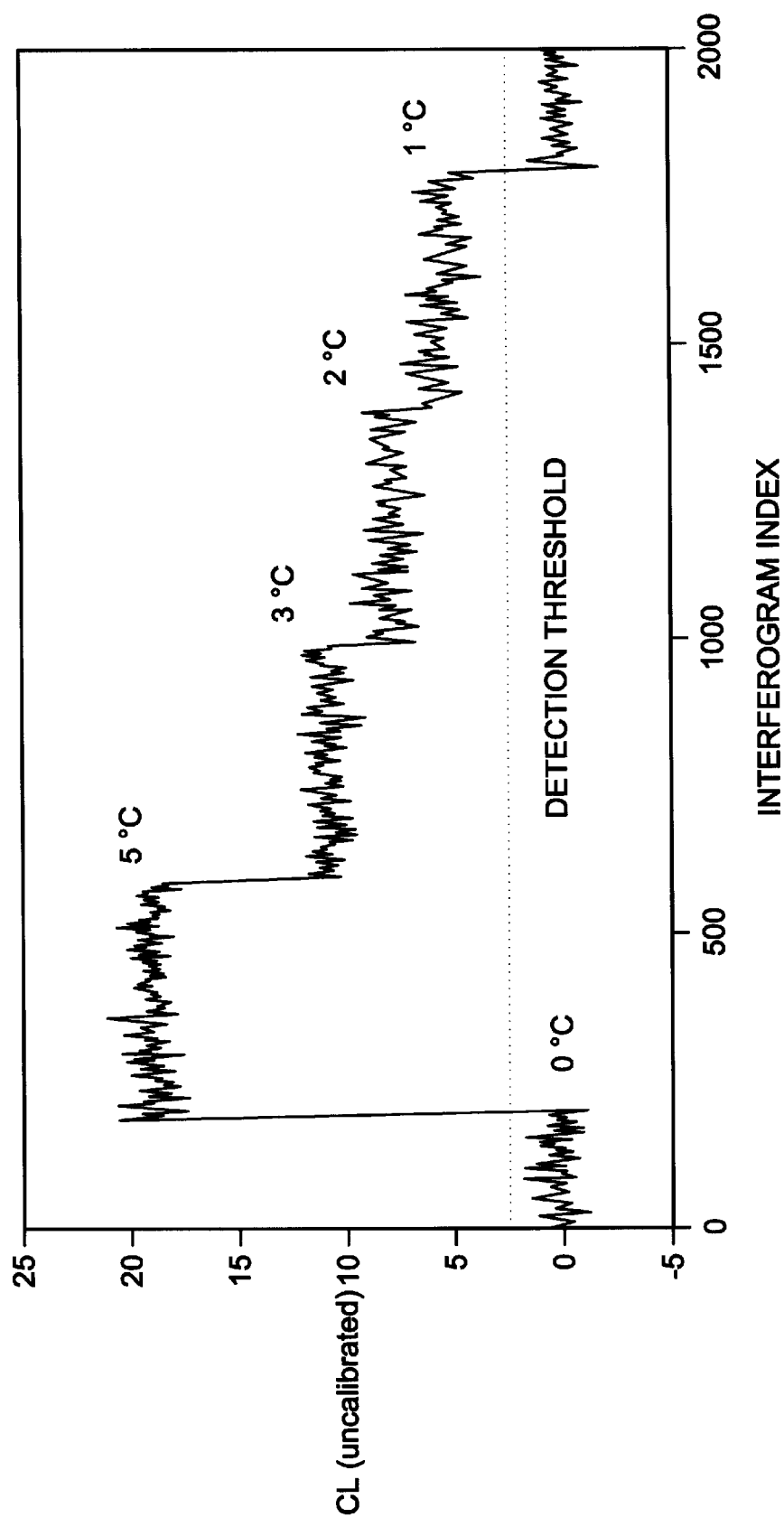
FIG-16 ESTIMATED CL AS A FUNCTION OF THE TEMPERATURE DIFFERENCE (ΔT) FOR GB BASED ON THE SECOND-ORDER CL (100% DETECTION, 0% FALSE ALARMS)

METHOD AND APPARATUS FOR ON-THE-MOVE DETECTION OF CHEMICAL AGENTS USING AN FTIR SPECTROMETER

BACKGROUND OF THE INVENTION

1. Field of the Invention

The present invention relates to Fourier transform infrared (FTIR) spectrometers and more particularly relates to a method and apparatus for detecting chemical agents in the atmosphere using an FTIR spectrometer mounted on a movable platform.

2. Description of the Prior Art

FTIR spectrometers are well known in the art. A typical FTIR spectrometer based on a Michelson interferometer is illustrated in FIG. 1. Typically, such FTIR systems have been used in a laboratory setting under controlled conditions to make qualitative measurements based on spectral signature analysis. However, within the last two decades, the FTIR spectrometer has been used to perform quantitative analysis of elements in an open and uncontrolled atmosphere. Such "open-path" applications include industrial monitoring of pollutants from a smoke stack and military monitoring of chemicals used in war zones. However, once the controlled environment of the laboratory is left behind, variables within the measurement path must be neutralized in order to achieve accurate results.

In the FTIR spectrometer of FIG. 1, an infrared source 2 reflecting or emitting from a sample to be analyzed is directed onto a semi-transparent optical beam splitter 4. The beam splitter 4 reflects approximately half (some loss due to losses in the beam splitter) of the infrared signal to a moving mirror 6 and transmits the remaining half of the signal to a fixed mirror 8. The moving mirror 6 is orthogonally aligned to the fixed mirror 8 and the beam splitter 4 is interposed between the mirrors at a 45° angle. The signals reflected off the fixed mirror 8 and the moving mirror 6 are combined by the beam splitter 4 and are reflected onto a detector 10. As the moving mirror 6 travels in a reciprocating fashion on a line parallel to the fixed mirror 8, the pathlength of the signals reflected by the moving mirror 6 varies. This creates a shift in the relative phase angles of the signals being combined by the beam splitter 4. This combination results in both constructive and destructive interference at the detector 10. This interference creates a position versus magnitude signal known as an interferogram. The detector 10 translates the optical interferogram into an analog voltage which is received by an analog to digital (A/D) converter 12. The A/D converter 12 creates a digital signal representing the detected optical interferogram signal. The digital signal from the A/D converter 12 is coupled to a computer 14 for digital signal processing to determine the concentration level of chemical species in the atmosphere. A helium-neon (HE—NE) laser 16 is used as a signal source for a secondary interferometer 18 to generate a single frequency sinusoidal time reference. The time reference from the HE—NE laser 16 is received by the A/D converter 12 and functions as a synchronizing clock for the A/D converter 12.

The operation of a traditional FTIR spectrometer is illustrated in the block diagram/flow chart of FIG. 2. This figure begins with an illustration of the previously described interferogram 20. The computer 14 is used to perform a fast Fourier transform (FFT) 22 which translates the time domain interferogram of block 20 into a frequency domain, single-beam spectrum 24. From the single beam spectrum 24, both a background spectrum (baseline spectrum) 26 and analytical spectrum 28 are derived. From the background and analytical spectra, a transmission spectrum 30 is calculated by dividing the analytical spectrum by the background spectrum. Finally, an absorption spectrum 32 is calculated as the negative logarithm of the transmission spectrum.

The background spectrum 26 is required to reduce baseline variations which can contribute to errors in open-path, centerline measurements. The background spectrum 26 is used to convert the subsequent analytical spectra 28 into compensated absorption spectra 32. This eliminates spectral distortions which may result from the characteristics of the source 2, beam splitter 4, detector 10, and interfering components within the measurement atmosphere. Ideally, the background spectrum 26 would be acquired by sampling the target atmosphere at a time when the target gas to be measured is not present. However, in an open-path system, this is not always possible and indirect background spectrum generation techniques are required. One such technique is known as synthetic background spectrum generation. In this method, a background spectrum 26 is created by taking samples of the original spectrum at points where no components are expected, then generating a curve to fit these sample points. A suitable curve fitting function is the polynomial defined by $$y = ax^2 + bx + c$$

where a, b, and c are coefficients to be calculated based on a least squares curve fitting algorithm.

3. Description of the Related Art

U.S. patent application Ser. No. 08/743,295, filed on Nov. 4, 1996, entitled "Apparatus and Method for Real-Time Spectral Alignment For Open-Path Fourier Transform Infrared Spectrometers", having Chung-Tao David Wang and Robert Howard Kagann as inventors, and U.S. patent application Ser. No. 08/992,227, filed Dec. 17, 1997, entitled "Apparatus and Method For Real-Time Spectral Alignment For Open-Path Fourier Transform Infrared Spectrometers", having the same inventors and being a continuation-in-part of U.S. patent application Ser. No. 08/743,295, the disclosure of each of which is incorporated herein by reference, disclose methods and apparatus to correct for wave number shifts associated with open-path FTIR spectrometer measurements. FIG. 4 of the drawing of the aforementioned applications (repeated herein as FIG. 3 with the same reference numerals) illustrates a block diagram of an FTIR spectrometer having a topology which is similar to that of the conventional FTIR spectrometer shown in FIG. 1 and including all of the components of the conventional system, but that the computer 14 is illustrated with the elements preferred to implement the digital signal processing algorithms disclosed in the aforementioned applications. These elements include a central processing unit (CPU) 70, which is electrically connected to a random access memory (RAM) 72, electrically alterable read-only memory (EAROM) 74 and read-only memory (RAM) 76. A display 78 is also operatively coupled to the CPU 70 to provide a visual or printed display of the output data. Alternatively, the output data may be ported to another processing unit or computer for further processing or storage.

FIG. 5 of the drawing in each of the aforementioned applications (repeated herein as FIG. 4) illustrates the operation of an FTIR spectrometer which is used to correct for wave number shifts. The FFT (block 22) of the conventional FTIR spectrometer shown in FIG. 1 is replaced with a phase correction and FFT (block 21). In this block, the computer 14 receives the digitally sampled interferogram from the A/D converter 12 and performs a "Forman" phase error correction to this signal. The result is a phase corrected, single beam spectrum as shown in block 24. The phase correction process reduces spectral distortions and errors in concentration measurements due to off-center and, therefore, asymmetrical, interferogram data. The "Forman" phase correction process is discussed in depth in the article "Correction of Asymmetric Interferograms Obtained in Fourier Spectroscopy," by M. L. Forman et al., in the *Journal of the Optical Society of America*, Vol. 56, No. 1, published in January, 1966, the disclosure of which is incorporated herein by reference.

A real-time frequency alignment step (block 34) is interposed between the steps of generating the analytical and background spectra and calculating the transmission spectrum (block 30). After both the background spectrum ($I_o(v)$) and analytical spectrum ($I(v)$) have been shifted in the frequency alignment step, the absorption spectrum can be calculated, as shown in Blocks 30 and 32 (FIG. 4 herein) by implementing the equation:

$$\text{Absorption spectrum} = -\log_{10}\left[\frac{I(v)}{I_o(v)}\right]$$

Once the absorption spectrum has been calculated, classical least squares regression analysis may be employed to calculate the concentration of the elements of interest (block 36). The result is a quantitative analysis output (block 40) suitable for human or machine evaluation.

A passive Fourier transform infrared (FTIR) spectrometer offers a cost-effective solution for remote sensing of industrial pollutants or chemical agent vapors in a battlefield environment. As shown in FIG. 5, the FTIR spectrometer is passive because it detects infrared radiation when there exists a difference between the chemical agent vapor temperature ($T_1$) and the background temperature ($T_2$) without using an infrared source. The captured spectral fingerprints are in the form of emission or absorption depending on whether the chemical vapor is warmer or colder than the background. The signal processing algorithm as shown in FIG. 6 carries out three operations:

1. Perform phase error correction, as disclosed in the aforementioned patent applications of the inventor herein;

2. Compute absorption spectrum as the negative logarithm ratio of the sample spectrum over the background spectrum: $A(v) = \log_{10}\{I(v)/I_0(v)\}$, where the v is the frequency in wave number ($cm^{-1}$) units; and 3. Perform classical least squares (CLS) quantitative analysis by minimizing the sum of squared error between the measured absorption spectrum $A^m(v)$ and the reference spectrum $A^r(v)$.

More specifically with respect to the third operation mentioned above, quantitative analysis is based on a multi-component regression model called classical least squares (CLS). Such a technique is described in the article, "Application of New Least Squares Methods for the Infrared Analysis of Multicomponent Samples", authored by David M. Haaland and Robert G. Easterling, published in *Applied Spectroscopy*, Volume 36, No. 6, 1982, the disclosure of which is incorporated herein by reference. Detection of the presence of a chemical agent is based on comparing the estimated concentration-pathlength product (CL) against three times the standard deviation (3σ) which is defined as the minimum detection limit (MDL). Utilizing a CLS analysis, the FTIR spectrometer can continuously detect chemical agents and monitor the minimum detection limits in various detection regions.

Current FTIR spectrometers for detecting industrial pollutants or chemical agent vapors in a battlefield environment, when the spectrometer is mounted on a movable platform such as a truck or other vehicle, cannot effectively handle spectral variations caused by the constantly changing field-of-view due to the motion of the vehicle. The FTIR spectrometer needs to acquire and continuously update the background spectrum in order to maintain required minimum detection limits (MDL's) and to combat atmospheric interference.

Another problem with conventional FTIR spectrometers is that a high concentration of a pollutant or chemical agent vapor may saturate the extremely sensitive spectrometer, resulting in detection errors.

OBJECTS AND SUMMARY OF THE INVENTION

It is an object of the present invention to provide a method and apparatus for improving the sensitivity of an FTIR spectrometer.

It is another object of the present invention to provide a method and apparatus which improves the detection sensitivity of an FTIR spectrometer under saturated conditions due to high concentrations of chemical agent vapors.

It is yet another object of the present invention to provide a method and apparatus for updating the background spectrum in real-time and in an adaptive manner for use in an FTIR spectrometer.

It is a further object of the present invention to provide an FTIR spectrometer and method which employ a quantitative analysis that reduces baseline variations between the measured spectrum and the reference spectrum.

It is still a further object of the present invention to provide an FTIR spectrometer and method which are adaptable for use on a movable platform.

It is still another object of the present invention to provide an FTIR spectrometer and method which overcome the disadvantages of conventional FTIR spectrometers and methods.

In accordance with one form of the present invention, a method of increasing the sensitivity of an FTIR spectrometer includes the step of obtaining a current background spectrum and a current analytical spectrum from an interferogram generated by a current scan of the FTIR spectrometer. Then, a weighted background spectrum is determined by taking the weighted average of the current background spectrum and background spectra from interferograms generated by scans of the FTIR spectrometer occurring previous to the current scan. The method further includes the step of determining the current absorption spectrum from the current analytical spectrum and the weighted background spectrum. Preferably, a classical least squares analysis is applied to the current absorption spectrum to obtain a concentration-pathlength product and a minimum detection limit for at least one selected chemical.

The method may also include the steps of comparing the obtained minimum detection limit with a predetermined minimum detection limit threshold, and adjusting the weighting factors of the weighted average in the weighted background spectrum determining step for a subsequent background spectrum obtained from an interferogram generated by a scan of the FTIR spectrometer occurring subsequent to the current scan.

In another form of the present invention, a method of increasing the sensitivity of an FTIR spectrometer includes the step of obtaining a background spectrum and an analytical spectrum from an interferogram generated by a scan of the FTIR spectrometer. Then, the absorption spectrum is determined from the analytical spectrum and the background spectrum. A classical least squares analysis is applied to the absorption spectrum and reference is made to a first reference spectrum for at least one selected chemical in order to obtain a concentration-pathlength product and a minimum detection limit for the at least one selected chemical.

In accordance with a preferred form of the method, a comparison is made of at least one of the concentration-pathlength product and the minimum detection limit with a predetermined concentration-pathlength product threshold and a minimum detection limit threshold respectively to determine if a saturation condition exists. If a saturation condition does exist, then at least a second reference spectrum is selected, which spectrum is different from the first reference spectrum for the at least one selected chemical. The classical least squares analysis is then reapplied to the absorption spectrum with reference to the at least second reference spectrum to obtain a concentration-pathlength product and a minimum detection limit for the at least one selected chemical.

In accordance with another aspect of the present invention, the sensitivity of the FTIR spectrometer may further be improved by using a second-order classical least squares model to obtain the concentration-path length product and the minimum detection limit. The second-order correction term introduced into the model will reduce baseline variations between the measured (absorption) spectrum and the reference spectrum. The second-order term in the model permits close matching between the two spectra and significantly improves the detection sensitivity of the FTIR spectrometer.

These and other objects, features and advantages of the present invention will be apparent from the following detailed description of illustrative embodiments thereof, which is to be read in connection with the accompanying drawing.

BRIEF DESCRIPTION OF THE DRAWING

FIG. 5 is a pictorial diagram of a passive FTIR spectrometer presented herein for illustrative and background purposes.

FIG. 6 is a flow chart/block diagram of adaptive processing techniques for an FTIR spectrometer in accordance with the present invention.

FIG. 7 is a graph of absorbance vs. wave number of the measured and reference spectra for the chemical agent GB (sarin), the reference spectrum being shown in a dashed line and the measured spectrum being shown in a solid line.

FIG. 8a is a graph of absorbance vs. wave number of the measured absorption spectrum for the chemical agent $SF_6$ (sulfur hexafluoride), shown in a solid line, plotted against a laboratory reference spectrum for the same chemical, shown in a dashed line.

FIG. 8b is a graph of absorbance vs. wave number illustrating the measured $SF_6$ spectrum with saturation, shown in a solid line, plotted against an adaptive $SF_6$ reference spectrum, shown in a dashed line, in accordance with the present invention.

FIGS. 9a and 9b are respectively graphs of estimated $SF_6$ concentration-pathlength products vs. scan index (time) before and after use of the adaptive signal processing techniques of the present invention.

FIGS. 10a and 10b respectively are graphs showing the minimum detection limits vs. scan index (time) for the chemical $SF_6$ before and after use of the adaptive signal processing techniques of the present invention, FIG. 10a corresponding to FIG. 9a and FIG. 10b corresponding to FIG. 9b.

FIG. 11 is a graph of the measured concentration-pathlength product for the chemical agent GB (sarin) as a function of the temperature difference between the chemical agent and the background, vs. the scan index.

FIG. 12 illustrates a flow chart for chemical agent detection using a classical least squares method in accordance with the present invention.

FIG. 13 is a graph of absorbance vs. frequency index which illustrates the relationship of the scale factors used in the classical least squares algorithm of the present invention.

FIG. 14a is a graph of absorbance vs. wave number for a typical measured spectrum for the chemical agent GB (sarin), plotted against the reference spectrum for the same chemical.

FIG. 14b is a graph of absorbance vs. wave number of the measured spectrum for the chemical agent GB (sarin), plotted against the reference spectrum, after the bias is subtracted in accordance with the classical least squares method of the present invention.

FIG. 14c is a graph of absorbance vs. wave number showing the measured spectrum for the chemical agent GB (sarin), plotted against the reference spectrum for the same chemical, after subtracting both the bias and linear terms from the absorption spectrum in accordance with the method of the present invention.

FIG. 14d is a graph of absorbance vs. wave number showing the measured spectrum for the chemical agent GB (sarin), plotted against the reference spectrum, after subtracting the bias, linear and squared terms from the spectrum, in accordance with the method of the present invention.

FIG. 15a is a graph of measured absorbance vs. wave number ($cm^{-1}$) showing the measured spectrum for the chemical agent GB (sarin), plotted against the reference spectrum for a particular interferogram.

FIG. 15b is a graph of residual absorbance vs. wave number ($cm^{-1}$) of the measured spectrum for the chemical agent GB (sarin) for the same scan shown in FIG. 15a, and illustrating the residual error spectrum after an iterative subtraction algorithm is performed in accordance with the method of the present invention.

FIG. 16 is a graph of the concentration-pathlength product vs. interferogram scan index for the chemical agent GB (sarin) derived in accordance with the quantitative analysis method of the present invention.

DETAILED DESCRIPTION OF THE PREFERRED EMBODIMENTS

Figure 1:
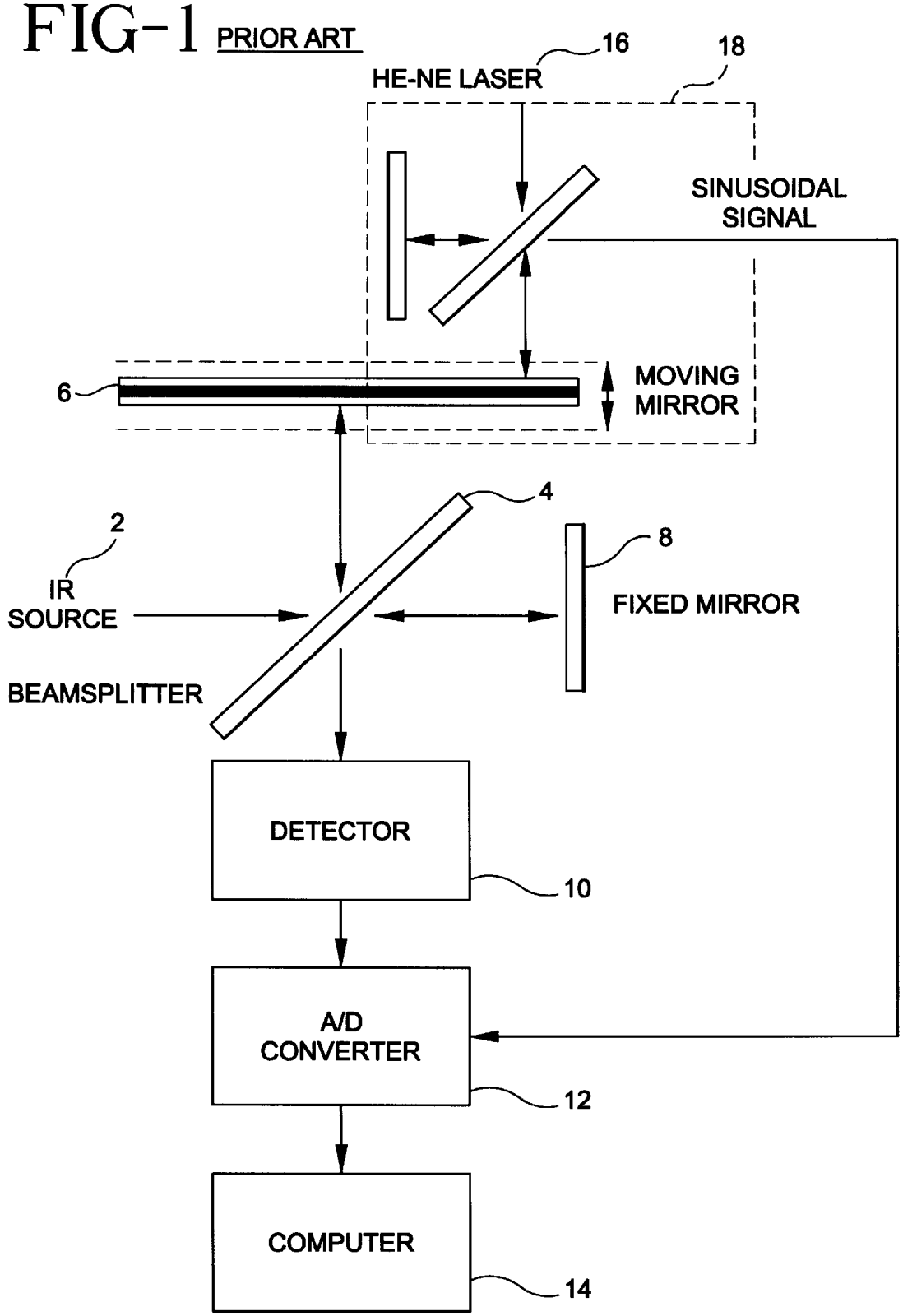
FIG. 1 is a block diagram of an FTIR spectrometer known in the prior art.
Figure 2:
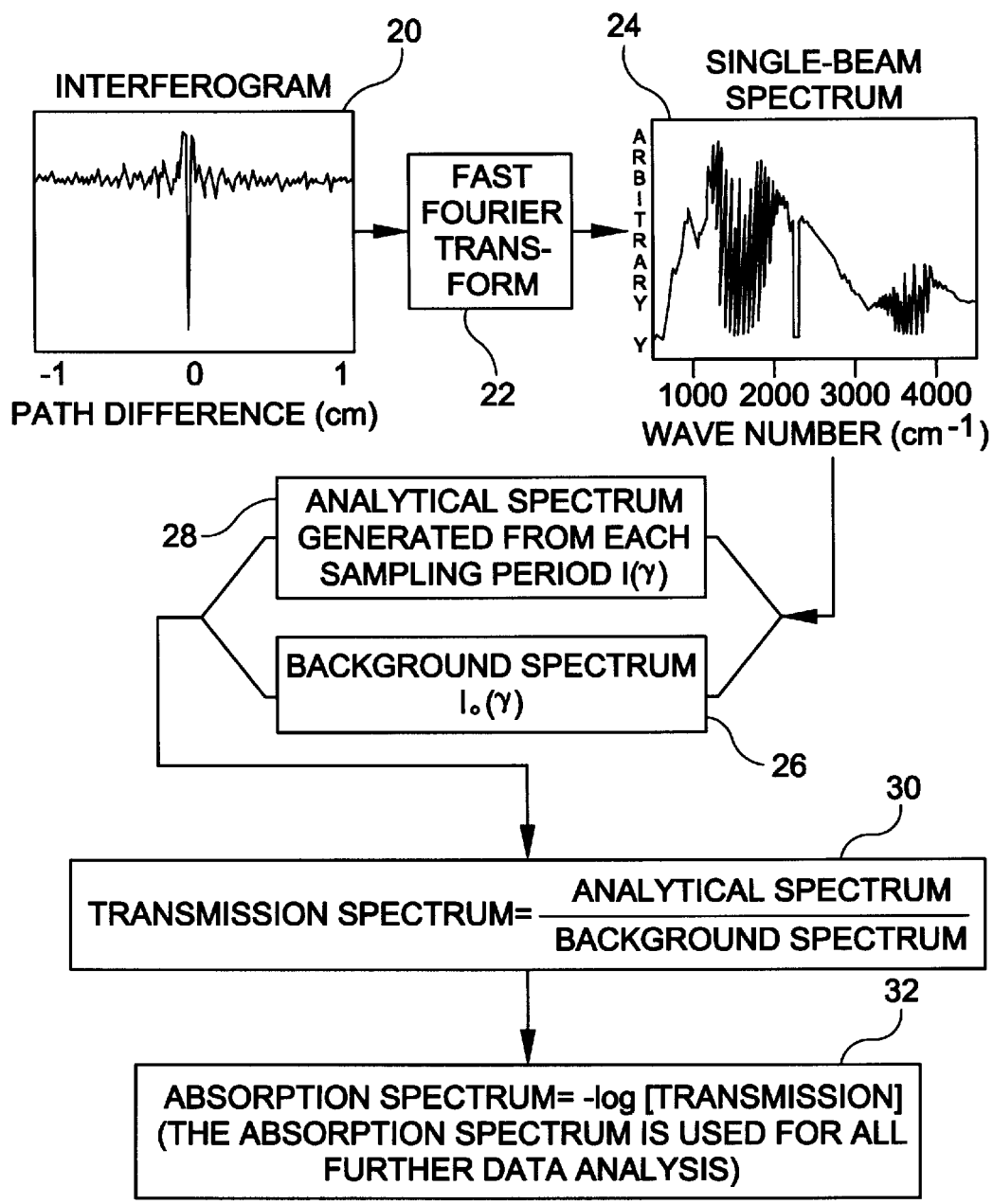
FIG. 2 is a flow chart showing the operation of the FTIR spectrometer known in the prior art.
Figure 3:
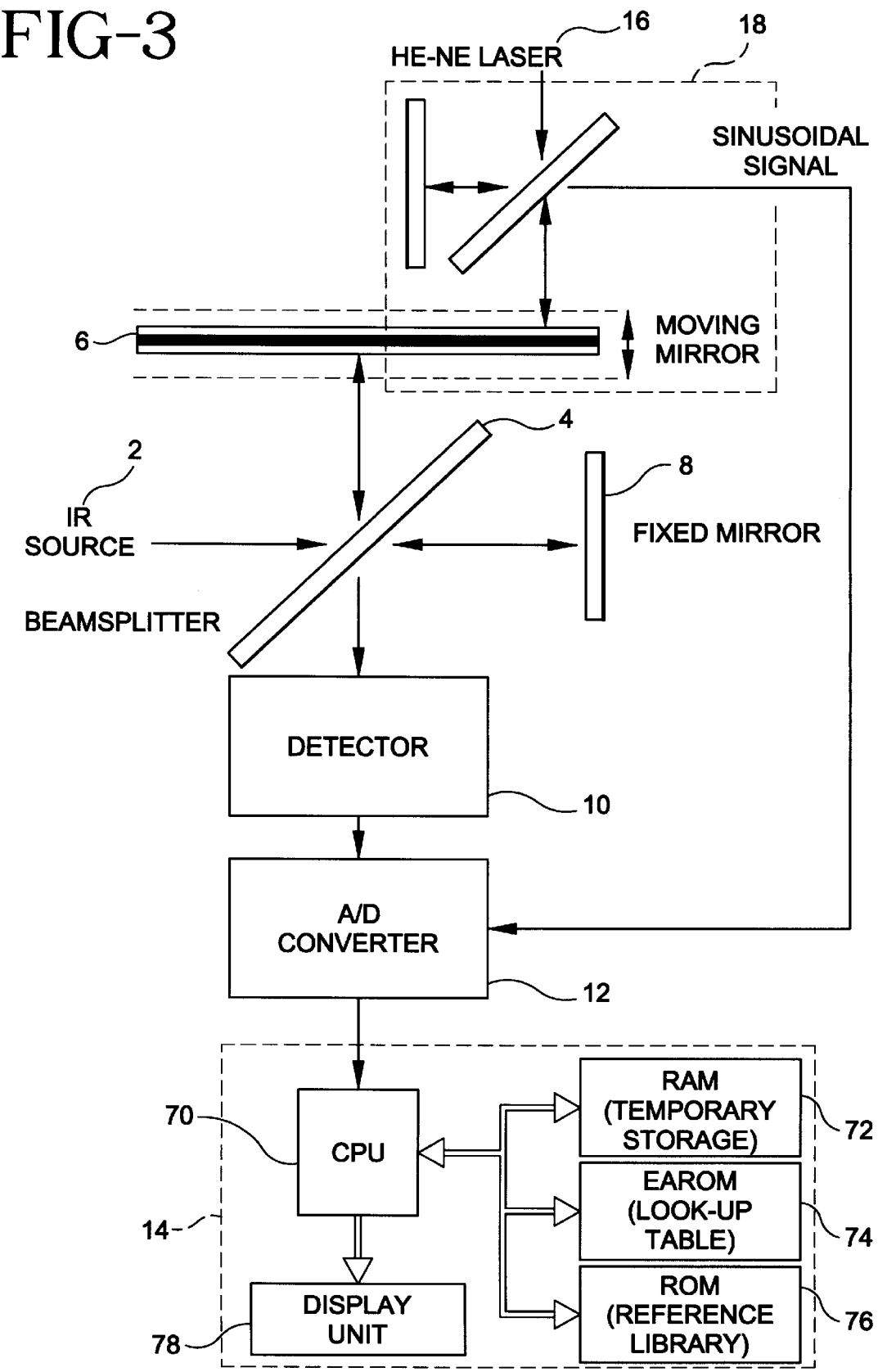
FIG. 3 is a block diagram of an FTIR spectrometer disclosed in the aforementioned patent applications of the same inventor.
Figure 4:
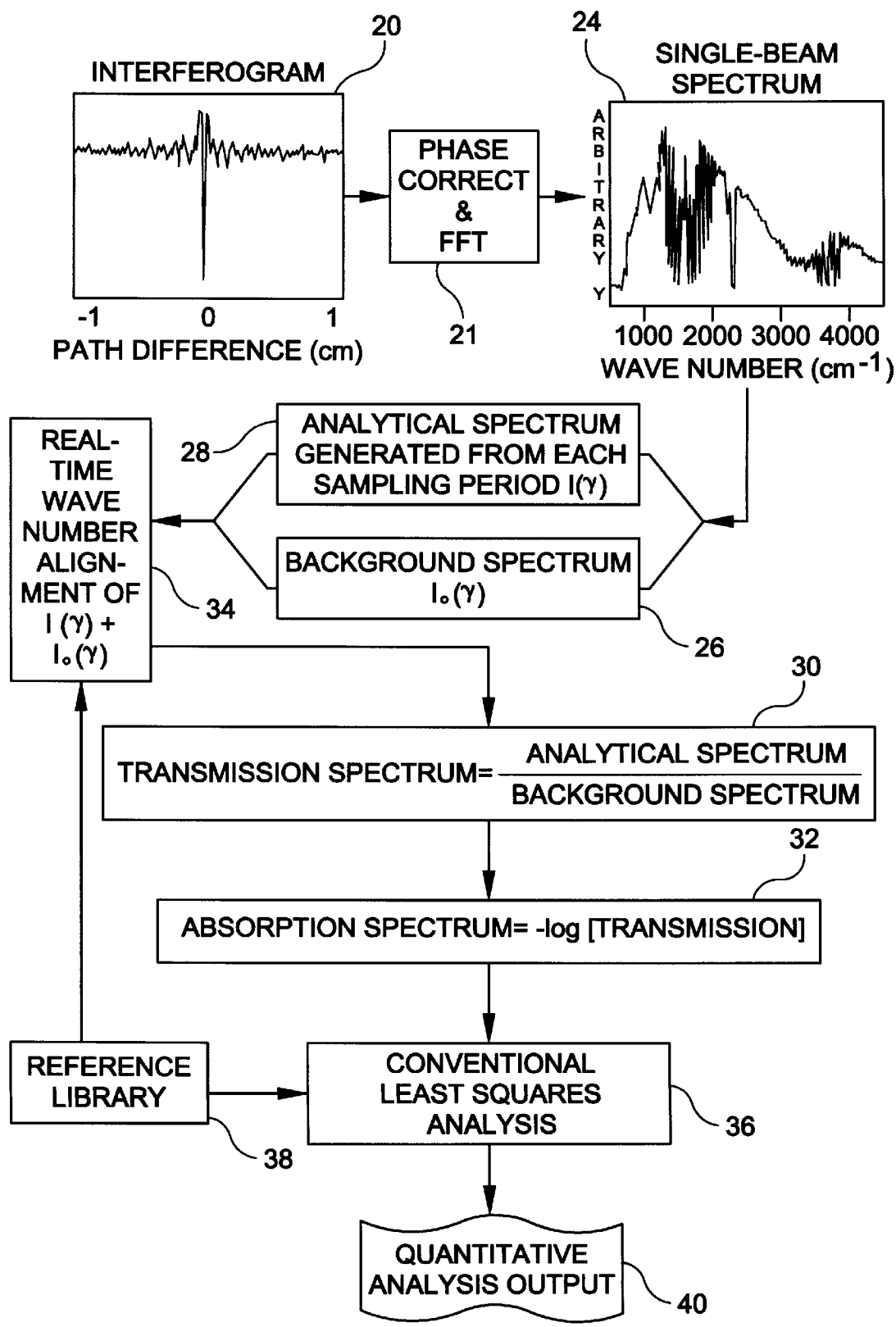
FIG. 4 is a functional diagram/flow chart of the operation of an FTIR spectrometer as described in the aforementioned patent applications.

FIG. 6 illustrates two preferred methods of the present invention to improve the sensitivity of an FTIR spectrometer. The first method is referred to in FIG. 6 as an "adaptive background", and is essentially a feedback loop relating to the generation of the background spectrum. The second method is referred to in FIG. 6 as an "adaptive reference" and involves another feedback loop employed in generating or selecting a particular reference spectrum to be used during the analytical processing performed by the FTIR spectrometer. The adaptive background feedback loop and the adaptive reference feedback loop may be used together, or separately.

In accordance with the present invention, for each scan of the FTIR spectrometer, an interferogram is generated. The interferogram is first processed by performing a phase error correction, such as by a phase error circuit or fast Fourier transform (FFT) circuit, before it is used to generate the absorption spectrum.

A background spectrum, $I_o(v)$, is generated from the interferogram, as is the analytical spectrum, $I(v)$, (not shown in FIG. 6). Oftentimes, the background spectrum is generated by a scan of the FTIR spectrometer with the shutter closed.

The phase corrected interferogram, from which is generated the background spectrum and the analytical spectrum, is used to compute the absorption spectrum, which is the negative logarithm ratio of the analytical (or sample) spectrum over the background spectrum, that is:

$$A(v) = -\log_{10}\{I(v)/I_o(v)\} \quad \text{(Eq. 1)}$$

where v is the frequency in wave number ($cm^{-1}$) units.

In accordance with the present invention, the absorption spectrum, $A(v)$, is provided to the processing unit of the FTIR spectrometer in which a quantitative analysis of the absorption spectrum is performed based on a multi-component regression model called classical least squares (CLS).

The CLS algorithm is a linear regression method to estimate the concentration-pathlength product and error standard deviation, which is also referred to as the minimum detection limit (MDL), for each chemical agent. The basic concept is to model the measured absorption spectrum, $A(v)$, as a linear combination of five terms:

$$A_m(v) = \underline{a + bv + cA_s(v) + dA_i(v)} + E$$
$$A_r \times \theta$$

where a is a dc bias term, b is a scale factor related to frequency (v), c is the concentration factor to chemical agent reference spectrum $A_s(v)$, d is the concentration factor to interference reference spectrum $A_i(v)$, and E is the standard error. The interference reference spectrum, $A_i(v)$, represents environment conditions, such as dust, or gas or diesel fumes emitted by moving vehicles, to better simulate the conditions experienced by the FTIR spectrometer during actual measurements. Oftentimes, however, the interference reference spectrum, $A_s(v)$, is omitted and just the chemical agent reference spectrum, $A_s(v)$, is used in the quantitative analysis performed by the spectrometer.

The optimization criterion is to compute the unknown parameter vector $\theta=[a,b,c,d]$, while minimizing the squared error ($E^2$). Mathematically, this is accomplished by setting the partial derivative of $E^2$ over $\theta$ to zero, and solve for the unknown $\theta$. The least squares solution is expressed as the ratio of the cross-correlation vector over the auto-correlation matrix of the reference absorption spectrum, that is, $\theta=A'X/A'A$, where $A=[1 \ v \ A_s(v) \ A_i(v)]$ and the matrix $X=[a \ b \ c \ d]$.

The cross-correlation, $A_r'A_m$, is the matrix product between the reference spectrum and the measured spectrum, and the auto-correlation matrix, $A_r'A_r$, is the product of the reference spectrum ($A_r$) with its own transpose ($A'_r$). The key element in the model is the built-in correction parameters [a,b] to compensate for baseline variations from scan to scan in the field test environment. The estimate of the variance is expressed by, $$\text{Var}(\theta)=(A_r'A_r-\theta A_r'A_m)/(n-m),$$

where n is the number of data points in the spectral region, and m is the number of unknown parameters to be estimated (m=4). The number of data samples is determined by the spectral region. For example, a 200 $cm^{-1}$ spectral region would require 50 data points assuming that the data spacing is 4 $cm^{-1}$. The standard deviation $\sigma$ of CLS is the square root of the uncertainty variance given by, $$\sigma^2=\text{Var}(\theta)(A_r'A_r)^{-1},$$

where the diagonal elements of the matrix are the variances of the individual parameters. For example, the third diagonal element is the uncertainty variance for the estimated concentration. The uncertainty standard deviation $\sigma$ is an important parameter because it defines the detection threshold ($3\sigma$) needed for chemical agent detection. The measured absorbance due to chemical absorption is proportional to the concentration-pathlength product (CL) of the infrared light through the chemical agent cloud.

Multi-component quantitative analysis techniques are preferably used, which compare the absorption spectrum measured in the field to a reference spectrum obtained from a vapor chamber with known concentrations. An example of measured vs. reference GB (sarin) spectra is shown in FIG. 7. The outputs of the CLS are the estimated concentration-pathlength product (CL) and the error standard deviation ($3\sigma$). These measurement parameters can be calibrated to $mg/m^2$ units, if the temperature difference between the chemical agent and the background is known. The standard deviation measure ($3\sigma$) is a measure of the minimum detection limit (MDL) and the estimation uncertainty, meaning that the concentration is in a confidence interval of $\{CL-3\sigma, CL+3\sigma\}$. In a strict sense the $\sigma$ values that quantify the CL product are valid only when the external radiance is significantly higher than the internal radiance of the FTIR spectrometer or when the internal radiance is spectrally subtracted from the numerator and the denominator of the logarithmic equation Eq. 1 shown previously. However, it has been found through many field and laboratory tests that the above measures for $\sigma$ represent good confidence limits regarding probability of detection and false alarms. Quantitative analysis is very accurate when the internal radiance is accounted for.

The quantitative analysis using the CLS method yields a detection report in the form of data which provides the identity of the chemical agent detected, the false alarm probabilities, the concentration-pathlength product (CL) and the minimum detection limit (MDL).

One of the problems with having an FTIR spectrometer mounted on a movable platform, such as ground vehicles, helicopters, amphibious assault ships, unmanned aerial vehicles and others, is that the spectrometer needs to acquire and continuously update the background spectrum in order to maintain the required MDL for each chemical agent and to combat atmospheric interference. It has been found that an adaptive background feedback loop based on a weighted average of current and previous co-added scans of the spectrometer improves the sensitivity and accuracy of the spectrometer in identifying chemical agents. This approach is essentially a decision-directed feedback method which allows the processing unit of the spectrometer in which the quantitative analysis using CLS is performed to decide whether the current spectrum should be integrated into the background spectrum.

The preferred weighting factors are as follows: 75% to the current scan and 25% to the previously co-added scans, or stated another way, $$I(i+1)=\alpha I_{adj}(i)+(1-\alpha)I(i-1)$$

where $\alpha$ is the weighting factor (for example, $\alpha=0.75$) and i is the scan index, i.e., a number identifying a particular scan. Based on the 0.75–0.25 weighting factor, the contributions from the previous scans are reduced exponentially as shown in Table 1 below.

TABLE 1

Weighted average background as a function of scan index

| Scan Index | Formula: $I_{i+1} = 0.75\ I_i + 0.25\ I_{i-1}$ |
|---|---|
| 1 | $I_1$ |
| 2 | $0.75\ I_2 + 0.25\ I_1$ |
| 3 | $0.75\ I_3 + 0.1875\ I_2 + 0.0625\ I_1$ |
| 4 | $0.75\ I_4 + 0.1875\ I_3 + 0.047\ I_2 + 0.015\ I_1$ |

For one or more chemical agents, the processing unit of the FTIR spectrometer preferably will compare the measured MDL with an MDL threshold. If the measured MDL is too high and, therefore, exceeds the expected MDL (i.e., the MDL threshold), the weighting factor is adjusted. For example, the weighting factor $\alpha$ may be changed from the initial 0.75 to 0.90 if the vehicle on which the spectrometer is mounted is moving very slowly, which gives more weight to the current background spectrum (generated by a current scan) and less weight to background spectra of previously co-added scans. Similarly, if the vehicle on which the spectrometer is mounted is moving quickly, it may be necessary to adjust the weighting factor $\alpha$ to 0.60, so that less weight is accorded the current spectrum and more weight is accorded the background spectra from previously co-added scans.

The weighted background spectra which are generated by this method are used, in conjunction with the measured or analytical spectrum to derive the absorption spectrum which is quantitatively analyzed preferably using the CLS method.

As mentioned previously, the FTIR spectrometer may include another detection technique in accordance with the present invention referred to as an adaptive reference. A problem in detecting chemical agent vapors in the battlefield, or for that matter industrial pollutants, is that the chemical cloud concentrations may become so high that the spectral features are saturated. In this case, the detection limit performance may degrade by a factor of 2 or higher.

FIG. 8a is an example of measured $SF_6$ absorption spectrum, shown in a solid line, plotted against a laboratory reference spectrum, shown in a dashed line. When the measured absorption spectrum is saturated, the sharp $SF_6$ features are lost and the bandwidth is wider. This problem may be compensated by using the adaptive reference spectrum technique of the present invention. FIG. 8b illustrates the measured $SF_6$ spectrum with saturation versus an adaptive $SF_6$ reference spectrum.

One method for generating an adaptive reference for the quantitative analysis using CLS is to sum the spectra weighted by their concentration-pathlength products using a weighted average approach:

$$A'(i+1)=0.5\ A'(i-1)+0.5\ A^m_{adj}(i)$$

where $A'(i-1)$ is the previous reference, $A^m(i)$ is the current measured spectrum, and i is the scan index. An important step in the procedure is to remove baseline variations from the measured absorption spectrum. This can be accomplished by subtracting the bias and linear term from the spectrum, $$A^m_{adj}(i)=A^m(i)-(a(i)+b(i)v),$$

where $a(i)$ and $b(i)$ are the bias and slope estimates of the current scan from the CLS analysis and v is the frequency in wave number ($cm^{-1}$) units. The last step of the process is to adjust the concentration-pathlength product of the updated reference spectrum by the same factor, $$CL(i+1)=0.5\ CL(i-1) +0.5\ CL(i),\ \text{for}\ i=1,2,3\ldots$$

where $CL(i-1)$ is the concentration-pathlength product of the previous reference spectrum and $CL(i)$ is the concentration-pathlength product of the current measured spectrum.

This method is further explained as follows. When an absorption spectrum is generated for a particular scan, it is quantitatively analyzed, with reference to a selected reference spectrum, to obtain the concentration-pathlength product (CL) and MDL, among other data. If the MDL is high compared to that which was expected, then a saturation condition may exist. This condition is further evidenced by a higher than expected concentration-pathlength product (CL). Thus, one or both of a high CL or MDL is indicative of saturation. Under such circumstances, a new reference spectrum is calculated for the next scan, using a weighted average approach.

More specifically, the reference spectrum (e.g., no. 1) used with the absorption spectrum (e.g., no. 1) of the current scan (e.g., index no. 1) is averaged with the absorption spectrum (no. 1) so that the two are effectively integrated together, in generate a new reference spectrum (no. 2) to be used in the quantitative analysis of the measured absorption spectrum (no. 2) for the next scan (index no. 2). The CL and MDL are then calculated for scan no. 2 using the weighted reference spectrum (no. 2).

In calculating the absorption spectrum's CL for scan no. 2, it is preferred to take into account the CL of the weighted reference spectrum (no. 2) used in the quantitative analysis for scan no. 2. The CL of the weighted reference spectrum (no. 2) is the average of the absorption spectrum's CL for scan no. 1 and the CL of the reference spectrum used in the quantitative analysis step for scan no. 1. The CL of the weighted reference spectrum (no. 2) is averaged with the calculated CL of the absorption spectrum for scan no. 2, and this new CL is outputted as the CL for the absorption spectrum for scan no. 2.

This new CL is also preferably used to determine if the weighted average, adaptive reference technique should continue. If the new CL or the MDL calculated for scan no. 2 is high compared to that which is expected, a new weighted reference spectrum (no. 3) is generated for use in the quantitative analysis of the measured absorption spectrum (no. 3) for the next subsequent scan (index no. 3). To do this, the previously weighted reference spectrum (no. 2) is averaged with the current absorption spectrum (no. 2) to generate the new weighted reference spectrum (no. 3).

The new weighted reference spectrum (no. 3) is used in the quantitative analysis of the measured absorption spectrum for the next scan (index no. 3), which yields a CL and an MDL. Preferably, however, the calculated CL for scan no. 3 is adjusted by taking into account the CL associated with the weighted reference spectrum (no. 3) used in the quantitative analysis for scan no. 3. The CL of the weighted reference spectrum (no. 3) is the average of the final (outputted) CL for the measured absorption spectrum of the previous scan (no. 2) and the CL of the weighted reference spectrum (no. 2) used in scan no. 2. This CL (for weighted reference spectrum no. 3) is averaged with the calculated CL of the absorption spectrum for scan no. 3 to obtain a final CL which is outputted as the CL for the absorption spectrum for scan no. 2.

This outputted CL and/or the MDL for scan no. 3 is compared with an expected CL and/or MDL to determine if a saturated condition still exists and whether the weighted average, adaptive reference method should continue for the next subsequent scan.

The first and second weighting factors for $A'(i-1)$ and $A^{madj}(i)$, respectively, may be different, but are preferably equal to 0.5 (50%). The same holds true for the third and fourth weighting factors for CL $(i-1)$ and CL$(i)$, respectively. Preferably, all four weighting factors are the same and equal to 0.5 (50%).

One of the advantages of this method is, by averaging the reference spectrum with the absorption spectrum to create a weighted reference spectrum, the noise in the spectrum will eventually average out since it is independent of the signal. This will improve the signal-to-noise ration (SNR) and, accordingly, the detection of the chemical.

In accordance with another form of the present invention, an adaptive reference method includes the step of determining whether a saturation condition exists. Such a saturation condition may be evidenced by at least one of a high concentration-pathlength product and a high MDL. During the data processing performed by the spectrometer, the concentration-pathlength product (CL), or the measured MDL, for at least one chemical agent, is compared to a concentration-pathlength product (CL) threshold or an MDL threshold. If the measured concentration-pathlength product or MDL exceeds the threshold, which is the expected concentration-pathlength product or MDL, then an alternative reference spectrum than the one previously used in the quantitative analysis is used.

The first reference spectrum which was used may be at low concentration-pathlength levels, such as 10 ppm-m (parts per million-meter) or 100 ppm-m. It may not simulate properly a saturated condition detected by the spectrometer. The alternative reference spectrum which is selected has a much higher concentration-pathlength level, for example, 1000 ppm-m, and more closely simulates the saturation condition existing in the environment. The alternative reference spectrum is now used in the quantitative analysis preferably employing a CLS method from which is generated a new concentration-pathlength product (CL) and MDL.

Again, during the detection processing step, a further comparison may be made between the CL and/or MDL thresholds and the new concentration-pathlength product and/or MDL. If the new CL and/or MDL exceeds its respective threshold, it may be necessary to select a third or greater number of reference spectra which fit even closer to the measured absorption spectrum quantitatively analyzed in the CLS step.

In an alternative form of the present invention, after a saturation condition is determined to exist, that is, when either or both of a high concentration-pathlength product or high MDL (i.e., exceeding their respective thresholds) are determined during the detection processing stage, multiple reference spectrums of differing concentrations may be provided to the spectrometer's processing unit and used in the CLS method to quantitatively analysis the absorption spectrum. The data from the quantitative analysis step, i.e., the various concentration-pathlength products and MDL's for each of the reference spectra are then compared, and the data which most closely fits the expected CL product and MDL is chosen for output.

A comparison of the estimated $SF_6$ concentration-pathlength product vs. time before and after use of the two adaptive signal processing techniques are shown in FIGS. 9a and 9b, respectively. The corresponding $3\sigma$ (MDL) are plotted in FIGS. 10a and 10b, respectively. From the figures, it can be seen that the average MDL is reduced from 0.36 to 0.08, or by a factor of 4.5, using the adaptive background and reference methods of the present invention.

Test Results Using The Adaptive Background and Reference Spectra

1. Dugway Vapor Chamber Data

The Dugway data package contains measured interferograms collected from three vapor chamber experiments by the U.S. Army, Dugway Proving Ground, Utah. The experiment duration for three chemical agents, sarin (GB), mustard (HD) and sulfur hexafluoride ($SF_6$), is in the order of 80 minutes. The scan rate for the passive FTIR spectrometer is about 2.5 interferograms per second. With a spectral resolution of about 4 cm$^{-1}$, each interferogram contains 8192 samples. As shown in Table 2, the controlled release is divided into five temperature difference intervals ranging from 5° C. to 1° C., with each interval lasting about 16 minutes or 400 interferograms.

TABLE 2

Release Script of the Dugway Vapor Chamber Test

| Time (min) | Scan Index | $\Delta T(° C.)$ | Description |
|---|---|---|---|
| 0–8 | 1–200 | 0 | Shutter Closed |
| 8–24 | 201–600 | 5 | Agent Release |
| 24–40 | 601–1000 | 3 | Agent Release |
| 40–56 | 1001–1400 | 2 | Agent Release |
| 56–72 | 1401–1800 | 1 | Agent Release |
| 72–80 | 1801–2000 | 0 | Shutter Closed |

The resulting concentration-pathlength product (CL) for chemical agent GB is shown in FIG. 11. The CL profiles contain 2,000 interferograms plotted as a function of the temperature difference ($\Delta T$) between the chemical agent vapor and the background. The overall detection performance is that the detection probabilities for GB and $SF_6$ are 100% and for HD, 90%. No false alarms were observed from the three chemical agents. Detecting HD, however, is more difficult than for GB because the primary peak at 722 cm$^{-1}$ is at the edge of the detector's bandwidth, and the SNR (signal-to-noise ratio) of the secondary peak at 1214 cm$^{-1}$ is low. When $\Delta T$ is reduced to 1° C., the HD absorption features can be affected by the system noise.

2. Boat Data For On-The-Move Detection

The Boat data was collected from a Navy experiment conducted in November 1996. Sulfur hexafluoride ($SF_6$) was disseminated from a release boat 450 yards away from the instrument boat. Table 3 is a brief script of the experiment and computed MDL's using two different background spectrum calculation processes. In the first method, the spectrum from a "shutter" scan (with the field-of-view of the instrument physically blocked) is used as the background spectrum for the entire experiment. The second is in accordance with the adaptive background method of the present invention.

TABLE 3

Summary of open-air SF$_6$ release from the Boat test

| Scan No. | Experiment Procedure Description | Shutter I$_o$(v) MDL (mg/m$^2$) | Adaptive I$_o$(v) MDL (mg/m$^2$) |
|---|---|---|---|
| 1–100 | Shutter Closed | 0.12 | 0.05 |
| 101–200 | Looking at the Boat | 0.24 | 0.05 |
| 201–300 | Shifting to another area | 0.56 | 0.05 |
| 301–600 | Release SF$_6$ | SF$_6$ Detected | SF$_6$ Detected |
| 601–1000 | Panning around | SF$_6$ Detected | SF$_6$ Detected |
| 1001–1100 | Shutter closed | 0.12 | 0.05 |

From the above experiments, it is apparent that the application of the adaptive background and reference spectra techniques to the Dugway vapor chamber data containing the nerve agent GB and the blister agent HD yields over 90% probability of detection without false alarms. Open-path field test data containing SF$_6$ (i.e., the boat data) was processed to validate the weighted-average background technique. The combination of the weighted-average background and the adaptive reference methods of the present invention has improved the minimum detection levels over the conventional approach by a factor of 4.5.

In accordance with another preferred form of the present invention, the quantitative analysis step for the detection of chemical agents employs a modified classical least squares (CLS) method. The basic concept is to introduce a second-order correction term into the linear regression model to reduce baseline variations between the measured spectrum and the reference spectrum.

The second-order correction term in the model permits close matching between the two spectra and significantly improves the detection sensitivity. This approach has been validated by the data collected from Edgewood Research, Development and Engineering Center (ERDEC), Dugway Proving Ground, Utah. The data was collected from a chemical vapor chamber containing chemical agents such as GB, HD and SF$_6$. The detection report is shown in the table below. The probabilities of detection (PD) for GB and SF$_6$ are 100% without false alarms among seven chemical agents (GA, GB, GD, GF, HD, SF$_6$ and LW). The probability of detection (PD) for HD is improved from 90% to 99.78%. Two out of 1600 interferograms of the HD data have been mis-identified as chemical agent LW, as summarized in Table 4 below:

TABLE 4

Summary of test results for detection of GB, HD and SF$_6$

| Agent | PD (%) | PFA (%) |
|---|---|---|
| GB | 100 | 0 |
| HD | 99.78 | 0.12 |
| SF$_6$ | 100 | 0 |

As described previously, the flowchart for chemical agent detection using the classical least squares (CLS) method is shown in FIG. 12. The signal processing procedure consists of bias removal, phase error correction, computing absorption spectrum, CLS quantitative analysis and final detecting of chemical agents. The outputs of the signal processing procedure are the detection (including CL and MDL) and false alarm probabilities.

The basic strategy of the improved CLS model is to reduce baseline variations between the measured absorption spectrum, A(v), and the reference spectrum, R(v), using the linear regression model:

$$A(v) = a + bv + cv^2 + d\, R(v) + \epsilon(v)$$

where A(v) is the measured spectrum of length N, R(v) is a reference spectrum (which generally includes the chemical reference and interference spectra), [a, b, c, d] are scale factors for modeling the dc bias, the frequency, the square of the frequency (v$^2$), and the concentration-pathlength product (CL), respectively. The major benefit of the new frequency-squared term in the linear regression model is to compensate for the largest baseline variation between the measured spectrum and reference spectrum. With the baseline variations removed, the detection sensitivity will be improved by a factor of two or higher. The last term $\epsilon(v)$ is the 1 by N column vector of error spectrum to be minimized. For convenience, the above equation is reduced to a matrix-vector product form as:

$$A(v) = [1\ v\ v^2\ R(v)] \times [a\ b\ c\ d]' + \epsilon(v)$$

$$A = X(v)\theta + E$$

where $X(v) = [1\ v\ v^2\ R(v)]$ is a 4 by N matrix of known quantities which are available from the chemical agent spectral library, $\theta$ is a column vector of four (4) unknown parameters to be estimated, [ ]' denotes the transpose operation of a row vector, and N is the number of data points in a spectral region containing the chemical agent fingerprints. FIG. 13 illustrates the relationship between the four elements in the X matrix graphically. It should be noted that the frequencies are normalized between –1 and 1 and the squares of the frequency between 0 and 1. These normalizations have been proven to improve computational accuracy for concentration-pathlength product estimates.

The benefit of baseline correction car, be best described by an example. FIG. 14a shows a typical measured GB spectrum A(v), plotted against the reference spectrum R(v). It can be readily seen that there is a large baseline variation between A(v) and R(v). The curvature (a second-order characteristic) in the measured spectrum is due to the background spectrum I$_o$(v) which was obtained from shutter scans with the field of view blocked. Using a second-order correction term in the linear regression model will compensate for the difference. FIG. 14b shows the spectrum after the bias is subtracted. FIG. 14c shows the spectrum after subtracting both the bias and linear terms. FIG. 14d shows the final spectrum after removing the bias, the linear and the squared terms. After the baseline is flattened, more accurate CL and 3σ values can be achieved. To determine the accuracy of the procedure, quantitative analysis is performed again on the error spectrum after the chemical agent is subtracted, using an iterative subtraction algorithm, from the spectrum (shown in FIG. 15a), as shown in FIG. 15b, leaving a residual error spectrum $\epsilon(v)$.

Test Results Using The Second-Order CLS Method

1. The Dugway Vapor Chamber Data

The Dugway database contains measured interferograms collected from vapor chamber experiments conducted by the US Army, Dugway Proving Ground, Utah on Nov. 13–14, 1996. The experiment duration for each of the three chemical agents sarin (GB), mustard (HD), and sulfur hexafluoride (SF$_6$) is in the order of 80 minutes. The scan rate for the passive FTIR spectrometer is about two interferograms per second. With a spectral resolution of 3.8580 cm$^{-1}$, the interferogram contains 8192 samples. As shown in Table 5, the controlled release is divided into five temperature difference intervals ranging from 5° C. to 0° C., with each interval lasting about 16 minutes or 400 interferograms.

TABLE 5

Release Script of the Dugway Vapor Chamber Test

| Minutes | Scan Index | ΔT (° C.) | Description |
| --- | --- | --- | --- |
| 0–8 | 1–200 | 0 | Shutter Closed |
| 8–24 | 201–600 | 5 | Agent Released |
| 24–40 | 601–1000 | 3 | Agent Released |
| 40–56 | 1001–1400 | 2 | Agent Released |
| 56–72 | 1401–1800 | 1 | Agent Released |
| 72–80 | 1801–2000 | 0 | Shutter Closed |

Background single-beam spectrum $I_o(v)$ determination is one of the most difficult problems in FTIR spectrometry. By definition, the background spectrum must not contain any chemical agents of interest. To achieve the highest signal-to-noise ratio (SNR), the first 200 spectra, known as the shutter scans, were co-added to form a mean background spectrum $I_o(v)$ for the chemical agent detection process. Each individual interferogram has been dc bias removed and phase corrected to achieve the best results. Both the adaptive background and the adaptive reference (weighted method) of the present invention were employed, along with the second-order CLS quantitative method.

The resulting concentration-pathlength product (CL) for chemical agent GB is shown in FIG. 16. The CL profiles contain 2,000 interferograms plotted as a function of the temperature difference (ΔT) between the chemical agent vapor and the background. During the shutter scans, the temperature difference is zero. The overall detection performance is that the detection probabilities for GB and $SF_6$ are 100% and for HD, 99.78%. Detecting HD is more difficult than GB or $SF_6$ because the primary peak at 722 cm$^{-1}$ is at the lower frequency edge of the spectrometer's infrared detector, and the secondary peak at 1214 cm$^{-1}$ is near the upper frequency edge. When the temperature difference is reduced to 1° C., the absorption features can be affected by the system noise. As a result, 2 out of 400 scans in the ΔT=1° C. period are mis-identified as chemical agent LW (Lewisite) instead. Using the CLS without the second-order term, however, the probability of detection for HD is about 90%.

The output of the signal processing step is a detection report displaying estimated CL(3σ) of each target chemical agent for each interferogram. Thus seven pairs of answers are tabulated for each interferogram in the order of chemical agent GA, GB, GD, GF, HD, $SF_6$ and LW. The maximum value of the concentration-pathlength product to three sigma ratio (CL/3σ) is the final output of the detection procedure. It is treated as the most likely chemical in the chemical agent family. The CL/3σ ratio allows the system to differentiate one target chemical agent from others which may have very similar and overlapping spectral fingerprints. The probability of detection (PD) is defined as the number of detections over the total number of scans, and the probability of false alarm (PFA) is the number of incorrect detections over the total number of scans. Sample detection reports are listed in Tables 6–8 for GB, HD, and $SF_6$, respectively.

TABLE 6

Summary of GB Detection
Probability of Detection = 100%
Probability of False Alarm = 0%

| | |
| --- | --- |
| 201 | 14.0(6.0) 21.0(1.7) 30.0(3.5) 21.4(3.1) 242.4(278.6) −0.8(1.2) 7.1(18.1) GB |
| 202 | 10.5(5.5) 18.5(1.5) 25.4(3.5) 18.7(2.5) 288.8(242.7) −1.0(1.1) 4.5(16.0) GB |
| 203 | 19.4(6.3) 20.8(3.1) 30.5(4.9) 22.3(4.0) 68.4(317.9) −0.8(1.4) −12.9(20.2) GB |
| 204 | 12.5(6.0) 21.2(1.4) 29.0(3.6) 21.4(3.0) 454.3(260.8) −1.0(1.2) −0.9(17.8) GB |
| 205 | 6.1(6.0) 18.8(1.7) 26.5(3.5) 18.3(3.2) 259.1(251.4) −0.9(1.1) 1.0(16.5) GB |
| 206 | 8.9(5.7) 18.6(1.6) 26.1(3.4) 18.5(3.0) 208.0(249.3) −0.9(1.1) 4.1(16.2) GB |
| 207 | 16.1(6.1) 20.9(2.3) 30.2(4.1) 21.3(3.6) 163.9(294.4) −0.7(1.3) 9.5(18.9) GB |
| 208 | 7.3(5.7) 18.5(1.5) 25.6(3.3) 17.9(3.0) 360.8(236.3) −1.0(1.1) −3.2(15.9) GB |
| 209 | 10.5(5.9) 19.6(1.7) 27.3(3.6) 19.4(3.1) 237.3(261.2) −1.0(1.2) 6.5(17.0) GB |
| 210 | 10.3(5.8) 18.7(1.9) 26.4(3.6) 19.0(3.1) 214.6(258.2) −1.1(1.1) 0.0(16.7) GB |
| 211 | 9.9(5.7) 19.2(1.5) 26.7(3.4) 19.3(2.9) 310.5(248.7) −0.9(1.1) −3.0(16.5) GB |
| 212 | 10.4(5.5) 18.2(1.7) 25.7(3.3) 17.5(3.1) 227.8(244.1) −0.8(1.1) 4.1(15.9) GB |
| 213 | 5.1(6.0) 17.4(2.3) 23.5(4.3) 16.7(3.5) 303.3(248.3) −1.1(1.1) −4.5(16.4) GB |
| 214 | 13.3(6.3) 20.5(2.3) 28.9(4.2) 20.6(3.6) 345.7(281.5) −0.9(1.3) 2.7(18.6) GB |
| 215 | 8.3(5.6) 17.7(1.9) 24.8(3.6) 17.4(3.2) 250.1(244.2) −0.9(1.1) −2.8(16.0) GB |
| 216 | 11.0(6.1) 20.2(1.8) 28.1(3.8) 20.1(3.3) 307.1(267.4) −1.0(1.2) 5.7(17.6) GB |
| 217 | 18.4(6.2) 20.6(2.9) 30.0(4.5) 21.8(3.9) 54.6(310.2) −0.7(1.4) 11.9(19.7) GB |
| 218 | 7.5(5.9) 18.9(1.6) 25.8(3.6) 18.5(3.1) 410.3(241.5) −0.9(1.1) −5.6(16.4) GB |
| 219 | 9.7(5.5) 18.6(1.4) 25.3(3.4) 18.1(3.0) 297.2(240.3) −0.9(1.1) 2.7(15.9) GB |
| 220 | 14.0(6.1) 20.7(2.1) 29.5(3.9) 21.3(3.3) 112.0(287.4) −0.8(1.3) 11.1(18.3) GB |
| 221 | 11.8(5.8) 20.1(1.5) 28.4(3.3) 20.1(3.0) 374.2(255.8) −1.0(1.2) −3.9(17.1) GB |
| 222 | 9.3(5.6) 18.6(1.5) 26.1(3.2) 18.3(3.0) 292.6(243.1) −1.0(1.1) −3.2(16.1) GB |
| 223 | 14.3(6.0) 19.6(2.5) 27.7(4.4) 20.2(3.6) 254.6(280.3) −0.8(1.2) 10.7(18.1) GB |
| 224 | 13.1(5.5) 18.8(1.9) 26.8(3.6) 19.6(2.9) 170.4(259.1) −1.0(1.1) 5.7(16.7) GB |
| 225 | 11.2(5.8) 19.9(1.5) 27.5(3.5) 20.2(2.9) 341.3(256.1) −0.9(1.2) −2.4(17.0) GB |
| 226 | 10.8(5.4) 18.7(1.4) 25.7(3.3) 18.3(2.9) 321.9(239.5) −0.7(1.1) 5.2(15.9) GB |
| 227 | 9.3(5.6) 18.1(1.8) 25.3(3.5) 18.2(3.0) 212.7(245.9) −0.9(1.1) 4.2(16.0) GB |
| 228 | 9.2(5.5) 18.4(1.9) 25.6(3.8) 18.6(3.1) 329.5(248.3) −1.2(1.1) −5.8(16.5) GB |
| 229 | 12.0(5.6) 19.3(1.6) 27.4(3.3) 19.6(2.9) 249.7(254.4) −0.8(1.1) 3.4(16.6) GB |
| 230 | 5.7(6.2) 19.1(1.9) 26.1(3.9) 18.2(3.4) 319.3(256.2) −1.0(1.1) −1.7(17.0) GB |
| 231 | 12.0(5.7) 19.5(1.7) 27.9(3.3) 20.0(2.9) 153.0(283.1) −0.9(1.1) 6.8(16.9) GB |
| 232 | 10.8(5.9) 19.3(1.9) 27.8(3.5) 19.2(3.2) 204.3(283.9) −1.0(1.2) −1.2(17.1) GB |
| 233 | 5.3(6.2) 17.7(2.4) 24.7(4.3) 16.7(3.8) 315.2(256.8) −1.1(1.1) −8.9(16.9) GB |
| 234 | 5.1(5.9) 18.8(1.8) 25.1(3.9) 18.1(3.3) 444.7(240.8) −0.9(1.1) −2.6(16.6) GB |
| 235 | 8.6(5.6) 18.5(1.5) 25.4(3.5) 18.2(3.0) 292.3(242.1) −1.0(1.1) 1.9(16.0) GB |
| 236 | 8.6(5.9) 19.0(1.7) 26.3(3.6) 18.5(3.2) 333.7(250.0) −1.1(1.1) −3.5(16.6) GB |
| 237 | 12.3(5.7) 19.5(1.7) 27.6(3.5) 19.7(3.1) 221.0(261.2) −0.8(1.2) 2.4(17.0) GB |
| 238 | 8.7(5.5) 17.6(1.7) 24.6(3.5) 17.6(3.0) 279.8(237.1) −0.9(1.1) −0.9(15.7) GB |

TABLE 7

Summary of HD Direction
Probability of Detection = 99.78%
Probability of False Alarm = 0.12%

| | | | | | | | | | |
|---|---|---|---|---|---|---|---|---|---|
| 201 | −35.6(37.8) | −77.0(51.5) | 223.4(133.6) | −194.2(201.2) | 84.9(9.3) | −7.9(414.7) | −130.4(112.3) | HD |
| 202 | −23.8(33.4) | −65.5(44.7) | 192.7(115.5) | −9.24(180.3) | 72.0(9.3) | −33.5(358.1) | −86.4(100.1) | HD |
| 203 | −24.7(39.5) | −79.6(52.2) | 237.7(133.7) | −137.0(210.3) | 84.8(11.0) | −81.3(420.7) | −110.1(116.9) | HD |
| 204 | −36.6(40.6) | −80.3(55.3) | 246.3(141.1) | −133.5(221.6) | 91.3(9.2) | −45.1(442.5) | −109.5(123.5) | HD |
| 205 | −49.1(46.6) | −105.3(62.5) | 292.6(163.7) | −208.7(254.4) | 108.3(8.5) | −109.6(515.7) | −143.1(142.5) | HD |
| 206 | −46.6(32.9) | −71.3(47.2) | 209.1(121.9) | −172.1(185.5) | 77.9(8.7) | −19.5(380.9) | −56.0(109.3) | HD |
| 207 | −29.9(39.1) | −77.7(52.5) | 223.5(136.5) | −179.6(206.4) | 85.9(9.8) | −70.5(420.9) | −127.4(114.8) | KD |
| 208 | −29.0(41.6) | −90.5(54.1) | 227.1(146.3) | −114.3(224.8) | 90.6(10.8) | −72.6(445.8) | −117.3(123.8) | HD |
| 209 | −41.6(34.6) | −85.3(46.0) | 178.3(131.3) | −115.6(195.5) | 79.0(9.6) | −30.0(390.2) | −55.4(112.1) | HD |
| 210 | −28.9(42.0) | −91.8(54.3) | 251.7(1429) | −168.9(222.4) | 90.8(11.3) | −29.4(449.6) | −130.7(123.2) | HD |
| 211 | −44.1(30.2) | −63.4(44.1) | 210.0(109.3) | −146.3(173.0) | 72.6(7.4) | −6.7(3524) | −67.1(100.1) | HD |
| 212 | −46.2(43.9) | −101.1(58.4) | 308.7(146.5) | −192.2(239.7) | 100.5(9.8) | −76.3(455.8) | −222.1(135.4) | HD |
| 213 | −34.5(38.2) | −73.9(52.4) | 246.4(129.9) | −148.8(207.0) | 86.7(7.8) | −46.3(416.9) | −108.5(115.8) | HD |
| 214 | −37.2(32.6) | −70.4(44.9) | 196.7(117.7) | −146.9(179.7) | 76.0(6.8) | −24.3(365.2) | −79.4(102.9) | HD |
| 215 | −35.1(46.1) | −87.9(62.4) | 321.5(147.9) | −189.4(245.3) | 102.7(9.9) | −57.4(496.2) | −148.8(135.5) | HD |
| 216 | −54.4(42.0) | −94.3(58.5) | 269.7(151.9) | −161.9(238.4) | 99.1(9.5) | −105.0(477.5) | −99.0(135.4) | HD |
| 217 | −31.5(40.5) | −78.4(54.9) | 247.4(138.6) | −174.3(21 5.5) | 87.6(11.7) | −50.7(437.3) | −135.9(118.7) | HD |
| 218 | −29.4(42.4) | −99.0(53.7) | 234.4(148.5) | −176.3(224.4) | 93.6(9.6) | −84.3(453.9) | −125.9(125.3) | HD |
| 219 | −35.8(42.8) | −92.5(56.6) | 262.7(147.1) | −199.5(227.4) | 96.2(9.1) | −70.1(464.0) | −145.8(125.9) | HD |
| 220 | −43.4(36.6) | −78.2(50.9) | 216.0(134.0) | −128.1(206.1) | 83.9(9.8) | −126.5(410.2) | −90.0(116.1) | HD |
| 221 | −48.0(45.0) | −99.1(61.0) | 302.3(154.0) | −178.7(247.9) | 104.0(9.1) | −69.8(499.2) | −111.9(140.5) | HD |
| 222 | −21.5(42.2) | −68.1(57.8) | 243.9(143.3) | −131.5(223.8) | 90.5(11.0) | −26.1(446.8) | −138.9(121.2) | HD |
| 223 | −45.9(34.8) | −68.4(50.4) | 242.1(122.3) | −138.4(197.8) | 81.7(8.7) | −82.8(397.1) | −74.0(113.2) | HD |
| 224 | −26.3(37.9) | −78.1(50.0) | 220.1(130.6) | −140.1(201.9) | 82.5(9.7) | −2.9(406.2) | −103.4(112.9) | HD |
| 225 | −11.9(43.5) | −83.5(56.8) | 253.3(145.0) | −172.8(225.0) | 91.1(12.2) | −50.5(455.0) | −164.5(120.2) | HD |
| 226 | −28.1(46.3) | −105.6(58.6) | 288.8(154.1) | −141.6(247.4) | 99.9(12.2) | −129.6(491.4) | −145.6(134.9) | HD |
| 227 | −37.6(33.5) | −66.2(47.1) | 224.6(115.7) | −132.1(185.9) | 77.8(7.0) | −36.7(374.2) | −77.5(105.8) | HD |
| 228 | −49.5(37.5) | −74.6(54.2) | 258.4(132.7) | −129.1(215.0) | 88.9(8.6) | −56.3(429.2) | −83.1(121.9) | HD |
| 229 | −39.4(41.7) | −91.6(55.5) | 286.8(138.3) | −165.5(226.4) | 95.3(8.1) | −51.2(466.5) | −109.0(127.8) | KD |
| 230 | −50.5(34.9) | −73.4(50.9) | 242.0(126.1) | −160.1(200.4) | 85.4(6.3) | −67.0(406.0) | −89.6(114.4) | HD |
| 231 | −41.0(35.1) | −75.6(48.6) | 228.4(123.9) | −131.3(196.6) | 81.6(7.9) | −65.5(394.1) | −68.5(112.6) | HD |
| 232 | −33.9(46.0) | −99.3(60.2) | 293.2(154.0) | −156.3(247.5) | 101.5(10.9) | −28.9(495.2) | −133.1(137.0) | HD |
| 233 | −36.8(34.8) | −76.4(47.0) | 226.6(120.2) | −147.0(190.5) | 79.6(7.8) | −11.9(385.5) | −86.7(108.3) | HD |
| 234 | −39.3(49.7) | −117.4(63.3) | 315.7(167.7) | −229.7(263.1) | 110.0(12.1) | −127.9(535.7) | −171.1(145.3) | HD |
| 235 | −26.0(30.5) | −59.4(41.5) | 129.7(114.6) | −37.6(168.7) | 62.5(11.4) | 20.5(331.1) | −38.5(95.6) | HD |
| 236 | −1.7(39.8) | −72.7(52.3) | 211.6(135.9) | −93.5(209.6) | 78.5(14.5) | 32.0(414.9) | −133.8(111.9) | HD |
| 237 | −30.2(36.3) | −72.8(49.0) | 221.2(125.2) | −102.8(198.3) | 81.8(7.6) | 7.7(394.2) | −83.4(111.3) | HD |
| 238 | −29.6(40.7) | −77.8(55.0) | 250.3(137.9) | −98.8(221.0) | 90.0(9.3) | −48.5(437.2) | −120.8(120.6) | HD |
| 239 | −25.3(40.3) | −88.1(52.0) | 243.5(136.2) | −136.5(214.9) | 88.6(9.1) | −19.6(430.3) | −127.0(117.6) | HD |
| 240 | −37.2(35.7) | −62.1(51.0) | 217.1(126.7) | −115.0(198.4) | 81.4(8.5) | −18.5(395.8) | −67.8(111.4) | HD |

TABLE 8

Summary of SF$_6$ Detcction
Probability of Detection = 100%
Probability of False Alarm = 0%

| | | | | | | | | |
|---|---|---|---|---|---|---|---|---|
| 201 | −5.3(9.2) | −4.2(6.6) | −9.0(9.9) | −6.9(7.5) | −303.4(386.8) | 7.8(0.4) | 14.6(24.9) | SF6 |
| 202 | −5.5(9.0) | −3.4(6.4) | −8.5(9.7) | −6.2(7.4) | −90.1 (381.9) | 7.7(0.3) | 6.0(24.4) | SF6 |
| 203 | −9.2(9.2) | −4.6(6.7) | −10.6(10.0) | −8.5(7.5) | −81.7(395.9) | 7.8(0.5) | 3.0(25.4) | SF6 |
| 204 | −5.3(9.3) | 4.1 (6.6) | −9.4(10.0) | −6.8(7.5) | −285.3(390.0) | 7.9(0.4) | 15.7(25.0) | SF6 |
| 205 | −4.1(9.3) | −2.7(6.7) | −7.1(10.1) | −5.9(7.5) | −183.5(394.1) | 7.9(0.4) | 14.6(25.2) | SF6 |
| 206 | −6.6(9.1) | −4.0(6.5) | −9.1(9.8) | −7.3(7.4) | −153.4(387.1) | 7.8(0.3) | 9.2(24.8) | SF6 |
| 207 | −1.9(10.1) | −2.5(7.2) | −6.6(10.9) | −5.1(8.3) | −359.9(418.5) | 52(0.6) | 27.6(26.6) | SF6 |
| 208 | −8.5(9.0) | −4.4(5.5) | −9.5(9.8) | −8.1(7.4) | −176.9(385.9) | 7.8(0.4) | 5.0(24.8) | SF6 |
| 209 | −5.8(9.2) | −3.5(6.6) | −8.6(10.0) | −6.8(7.6) | −162.3(391.7) | 7.9(0.4) | 10.5(25.1) | SF6 |
| 210 | −4.9(9.2) | −3.9(6.6) | −9.0(9.9) | −6.7(7.5) | −206.4(390.3) | 7.8(0.4) | 17.8(24.9) | SF6 |
| 211 | −4.9(9.4) | −3.5(6.7) | −7.6(10.2) | −6.4(7.7) | −317.1(394.2) | 7.9(0.5) | 13.1(25.5) | SF6 |
| 212 | −8.7(9.1) | −4.3(6.6) | −9.6(9.9) | −8.0(7.5) | −152.7(390.8) | 7.9(0.4) | 6.4(25.1) | SF6 |
| 213 | −9.3(9.2) | −5.1 (5.5) | −11.2(9.9) | −8.3(7.5) | −146.3(395.0) | 7.8(0.5) | 8.5(25.3) | SF6 |
| 214 | −6.1(9.1) | −3.5(6.6) | −8.3(9.8) | −6.5(7.5) | −149.4(387.4) | 7.8(0.4) | 6.4(24.9) | SF6 |
| 215 | −3.2(9.7) | −3.7(6.9) | −8.6(10.4) | −6.7(7.9) | −231.8(409.0) | 8.2(0.4) | 19.7(26.0) | SF6 |
| 216 | −6.4(9.3) | −3.4(6.7) | −8.4(10.0) | −6.5(7.6) | −154.3(394.8) | 7.8(0.5) | 15.7(25.1) | SF6 |
| 217 | −2.1(9.4) | −3.1(6.7) | −7.7(10.1) | −5.6(7.7) | −256.7(394.8) | 8.0(0.4) | 15.4(25.3) | SF6 |
| 218 | −6.8(9.2) | −4.3(6.6) | −9.7(9.9) | −7.9(7.5) | −134.1(392.5) | 7.9(0.3) | 8.6(25.1) | SF6 |
| 219 | −3.1(9.8) | −2.8(7.0) | −7.1(10.6) | −5.5(8.0) | −357.4(407.3) | 8.1(0.6) | 24.3(26.0) | SF6 |
| 220 | −9.5(92) | −4.3(6.7) | −9.4(10.0) | −7.9(7.6) | −196.6(395.9) | 7.8(0.5) | 3.8(25.5) | SF6 |
| 221 | −4.6(9.2) | −3.6(6.6) | −8.3(9.9) | −6.8(7.5) | −144.1(390.7) | 7.9(0.3) | 9.7(25.0) | SF6 |

TABLE 8-continued

Summary of SF$_6$ Detection
Probability of Detection = 100%
Probability of False Alarm = 0%

| | | | | | | | |
|---|---|---|---|---|---|---|---|
| 222 | −7.4(9.1) | −4.0(6.6) | −9.6(9.8) | −7.3(7.5) | −189.6(388.4) | 7.8(0.4) | 14.5(24.8)SF6 |
| 223 | −3.3(9.4) | −3.7(6.7) | −8.4(10.1) | −6.1(7.7) | −303.4(394.1) | 7.9(0.4) | 19.2(25.2)SF6 |
| 224 | −5.0(9.4) | −3.5(6.7) | −8.4(10.1) | −6.3(7.7) | −190.4(395.3) | 7.9(0.5) | 8.0(25.4)SF6 |
| 225 | −4.7(9.6) | −4.3(6.8) | −9.4(10.3) | −7.6(7.8) | −268.7(402.6) | 8.1(0.4) | 18.4(25.7)SF6 |
| 226 | −10.0(9.0) | −4.8(6.6) | −10.5(9.8) | −8.4(7.4) | −146.6(389.6) | 7.7(0.5) | 9.7(24.9)SF6 |
| 227 | −6.9(9.2) | −42(6.6) | −8.8(9.9) | −7.4(7.5) | −245.6(389.3) | 7.7(0.5) | 7.3(25.1)SF6 |
| 228 | −6.1(9.0) | −4.2(6.5) | −9.4(9.7) | −7.5(7.4) | −157.9(384.0) | 7.8(0.3) | 7.9(24.6)SF6 |
| 229 | −1.6(9.8) | −2.8(7.0) | −7.4(10.6) | −5.6(8.0) | −274.3(410.3) | 8.1(0.5) | 22.5(26.1)SF6 |
| 230 | −2.8(9.8) | −3.1(7.0) | −7.0(10.5) | −5.7(8.0) | −384.4(405.4) | 8.1(0.6) | 22.8(26.0)SF6 |
| 231 | −2.8(9.5) | −3.0(6.8) | −6.9(10.2) | −5.8(7.7) | −3027(395.9) | 8.0(0.5) | 18.0(25.4)SF6 |
| 232 | −4.9(9.3) | −2.8(6.7) | −7.5(10.0) | −5.7(7.6) | −92.1(392.9) | 7.9(0.3) | 10.1(25.1)SF6 |
| 233 | −8.7(9.2) | −4.4(6.7) | −9.6(10.0) | −7.6(7.6) | −210.5(394.9) | 7.9(0.4) | 13.5(25.3)SF6 |
| 234 | 0.4(10.4) | −1.9(7.5) | −5.6(11.3) | 4.2(8.6) | −368.7(433.2) | 8.2(0.8) | 28.4(27.5)SF6 |
| 235 | −1.3(9.8) | −2.0(7.0) | −5.7(10.6) | −4.6(8.1) | −178.5(412.9) | 8.0(0.6) | 17.8(26.3)SF6 |
| 236 | −6.0(9.4) | −3.9(5.7) | −8.6(10.1) | −6.9(7.7) | −233.2(395.9) | 8.0(0.3) | 14.7(25.4)SF6 |
| 237 | −7.7(9.2) | −4.7(6.6) | −10.6(9.9) | −8.1(7.5) | −−205.8(391.7) | 7.9(0.4) | 14.2(25.1)SF6 |
| 238 | −7.3(9.1) | −4.1(6.5) | −9.3(9.8) | −7.3(7.4) | −174.7(387.2) | 7.8(0.3) | 7.6(24.9)SF6 |

Figure 17:
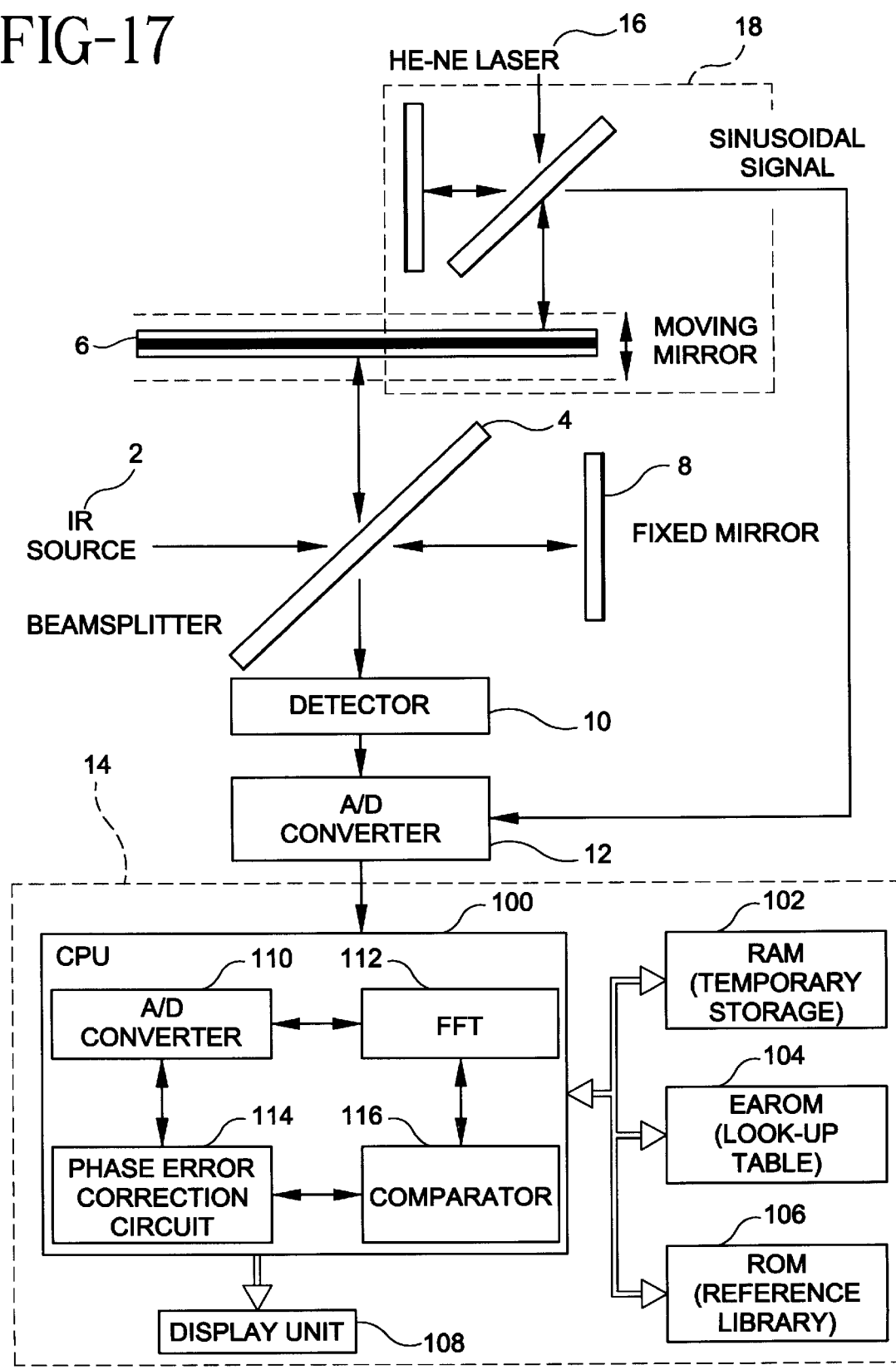
FIG. 17 is a block diagram of an FTIR spectrometer formed in accordance with the present invention.

FIG. 17 illustrates a block diagram of an FTIR spectrometer formed in accordance with the present invention. This topology is similar to that of FIG. 1 and includes all of the components of the conventional system; however, the computer 14 is further illustrated with the elements preferred to implement the improved digital signal processing algorithms of the present invention. These elements include a central processing unit (CPU) 100 which is electrically connected to a random access memory (RAM) 102. The CPU 100 would carry out the phase error correction, FFT, A/D conversion and quantitative analysis steps of the processes, including preferably a CLS analysis, and even more preferably, a second-order CLS analysis. The CPU 100, therefore, effectively includes an A/D converter circuit 110, an FFT circuit 112, a phase error correction circuit 114, and a comparator circuit 116 for making the comparisons used in the adaptive background and adaptive reference feedback loops. The RAM 102 would contain the operating program for the CPU. Also included are an electrically alterable read-only memory (EAROM) 104 and read-only memory (ROM) 106. These memories would store the interferogram data, the background and analytical spectra, the transmission, reference and absorption spectra, and the concentration-pathlength product (CL), MDL and PFA, among other data. A display 108 is also operatively coupled to the CPU 100 to provide a visual or printed display of the output data. Alternatively, the output data may be ported to another processing unit or computer for further processing or storage. It should be realized that these elements may be discrete components or may be formed as part of a computer where the algorithms are carried out as a computer process.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A method of increasing the sensitivity of a Fourier transform infrared (FTIR) spectrometer, the method comprising the steps of:

obtaining a current background spectrum and a current analytical spectrum from an interferogram generated by a current scan of the FTIR spectrometer;

determining a weighted background spectrum by taking the weighted average of the current background spectrum and background spectra from interferograms generated by scans of the FTIR spectrometer occurring previous to the current scan; and determining a current absorption spectrum from the current analytical spectrum and the weighted background spectrum.

2. A method of increasing the sensitivity of an FTIR spectrometer as defined by claim 1, which further comprises the step of:

applying a classical least squares analysis to the current absorption spectrum to obtain a concentration-pathlength product and a minimum detection limit for at least one selected chemical.

3. A method of increasing the sensitivity of an FTIR spectrometer as defined by claim 2, which further comprises the steps of:

comparing the obtained minimum detection limit with a predetermined minimum detection limit threshold; and adjusting the weighting factors of the weighted average in the weighted background spectrum determining step for a subsequent background spectrum from an interferogram generated by a scan of the FTIR spectrometer occurring subsequent to the current scan.

4. A method of increasing the sensitivity of a Fourier transform infrared (FTIR) spectrometer, the method comprising the steps of:

obtaining a background spectrum and an analytical spectrum from an interferogram generated by a scan of the FTIR spectrometer;

determining an absorption spectrum from the analytical spectrum and the background spectrum;

applying a classical least squares analysis to the absorption spectrum and referring to a first reference spectrum for at least one selected chemical to obtain a concentration-pathlength product and a minimum detection limit for the at least one selected chemical;

comparing at least one of the concentration-pathlength product and the minimum detection limit with a predetermined concentration-pathlength product threshold and a minimum detection limit threshold respectively to determine if a saturation condition exists; and if a saturation condition exists, selecting at least a second reference spectrum which is different from the first reference spectrum for the at least one selected chemical and reapplying a classical least squares analysis to the absorption spectrum with reference to the at least second reference spectrum to obtain a concentration-pathlength product and a minimum detection limit for the at least one selected chemical.

5. A method of increasing the sensitivity of a Fourier transform infrared (FTIR) spectrometer, the method comprising the steps of:

obtaining a background spectrum and an analytical spectrum from an interferogram generated by a scan of the FTIR spectrometer;

determining an absorption spectrum from the analytical spectrum and the background spectrum;

applying a classical least squares analysis to the absorption spectrum and referring to a first reference spectrum for at least one selected chemical to obtain a concentration-pathlength product and a minimum detection limit for the at least one selected chemical;

comparing at least one of the concentration-pathlength product and the minimum detection limit with a predetermined concentration-pathlength product threshold and a minimum detection limit threshold respectively to determine if a saturation condition exists;

if a saturation condition exists, reapplying a classical least squares analysis to the absorption spectrum and referring to a plurality of reference spectra which are different from the first reference spectrum for the at least one selected chemical to obtain a plurality of concentration-pathlength products and minimum detection limits corresponding to the plurality of reference spectra referred to for the at least one selected chemical; and comparing at least one of the plurality of concentration-pathlength products with one another and the plurality of minimum detection limits with one another to determine at least one of the following: 1) which one of the plurality of concentration-pathlength products is the greatest; and 2) which one of the plurality of minimum detection limits is the lowest; and identifying the chemical based on at least one of the greatest concentration-pathlength product and the lowest minimum detection limit.

6. A method of increasing the sensitivity of a Fourier transform infrared (FTIR) spectrometer, the method comprising the steps of:

obtaining a current background spectrum and a current analytical spectrum from an interferogram generated by a current scan of the FTIR spectrometer;

determining a current absorption spectrum from the current background and analytical spectra; and applying a classical least squares analysis to the current absorption spectrum and referring to a weighted reference spectrum for at least one selected chemical to obtain a concentration-pathlength product and a minimum detection limit for the at least one selected chemical, the classical least squares analysis step including the steps of removing the bias terms and any linear terms relating to frequency from the current absorption spectrum;

wherein the weighted reference spectrum is determined by the following steps:

weighting a previous reference spectrum associated with a scan of the FTIR spectrometer occurring previous to the current scan by a first weighting factor and weighting the current absorption spectrum by a second weighting factor to respectively obtain a weighted previous reference spectrum and a weighted current absorption spectrum; and summing the weighted previous reference spectrum and the weighted current absorption spectrum to obtain the weighted reference spectrum.

7. A method of increasing the sensitivity of an FTIR spectrometer as defined by claim 6, wherein the first and second weighting factors are equal and are 0.5 (50%).

8. A method of increasing the sensitivity of an FTIR spectrometer as defined by claim 6, wherein the step of obtaining the concentration-pathlength product for the current absorption spectrum includes the further steps of:

weighting the concentration-pathlength product associated with the previous reference spectrum by a third weighting factor, and weighting the concentration-pathlength product associated with the current absorption spectrum by a fourth weighting factor to respectively obtain a weighted previous concentration-pathlength product and a weighted current concentration-pathlength product; and summing the weighted previous concentration-pathlength product and the weighted current concentration-pathlength product to obtain a final concentration-pathlength product associated with the current absorption spectrum for the at least one selected chemical.

9. A method of increasing the sensitivity of an FTIR spectrometer as defined by claim 7, wherein the third and fourth weighting factors are equal and are 0.5 (50%).

10. A method of increasing the sensitivity of an FTIR spectrometer as defined by claim 7, wherein the first, second, third and fourth weighting factors are equal and are 0.5 (50%).

11. A method of increasing the sensitivity of a Fourier transform infrared (FTIR) spectrometer, the method comprising the steps of:

obtaining a background spectrum and an analytical spectrum from an interferogram generated by a scan of the FTIR spectrometer;

determining an absorption spectrum from the analytical spectrum and the background spectrum; and applying a classical least squares analysis to the absorption spectrum and referring to a reference spectrum for at least one selected chemical to obtain a concentration-pathlength product and a minimum detection limit for the at least one selected chemical;

wherein the step of applying a classical least squares analysis further comprises using a second-order term in the classical least squares analysis to reduce baseline variations between the measured absorption spectrum and the reference spectrum.

12. A method of increasing the sensitivity of a Fourier transform infrared (FTIR) spectrometer, the method comprising the steps of:

obtaining a background spectrum and an analytical spectrum from an interferogram generated by a scan of the FTIR spectrometer;

determining an absorption spectrum from the analytical spectrum and the background spectrum; and applying a classical least squares analysis to the absorption spectrum and referring to a reference spectrum for at least one selected chemical to obtain a concentration-pathlength product and a minimum detection limit for the at least one selected chemical;

wherein the classical least squares analysis includes the steps of:

removing a bias from the measured absorption spectrum;

removing any linear terms relating to frequency from the measured absorption spectrum; and removing any second-order terms relating to frequency from the measured absorption spectrum.

13. A method of increasing the sensitivity of an FTIR spectrometer as defined by claim 12, wherein the step of applying a classical least squares analysis to the absorption spectrum includes the further step of:

subtracting the reference spectrum from the measured absorption spectrum to obtain a residual error spectrum.

* * * * *